United States Patent
Park

(10) Patent No.: US 9,583,103 B2
(45) Date of Patent: Feb. 28, 2017

(54) METHOD OF CONTROLLING A TEXT INPUT AND ELECTRONIC DEVICE THEREOF

(71) Applicant: Samsung Electronics Co., Ltd, Gyeonggi-do (KR)

(72) Inventor: Gwang-Ha Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/698,035

(22) Filed: Apr. 28, 2015

(65) Prior Publication Data

US 2015/0317299 A1 Nov. 5, 2015

(30) Foreign Application Priority Data

Apr. 30, 2014 (KR) ........................ 10-2014-0052540

(51) Int. Cl.

| | |
|---|---|
| *G10L 21/00* | (2013.01) |
| *G10L 15/00* | (2013.01) |
| *G10L 15/22* | (2006.01) |
| *G10L 15/26* | (2006.01) |
| *G06F 3/16* | (2006.01) |
| *G06F 3/02* | (2006.01) |
| *G10L 15/18* | (2013.01) |
| *G06F 17/27* | (2006.01) |
| *G06F 3/023* | (2006.01) |
| *G06F 3/0488* | (2013.01) |

(52) U.S. Cl.
CPC ............. *G10L 15/22* (2013.01); *G06F 3/021* (2013.01); *G06F 3/0233* (2013.01); *G06F 3/04886* (2013.01); *G06F 3/167* (2013.01); *G06F 17/273* (2013.01); *G10L 15/1822* (2013.01); *G10L 15/265* (2013.01); *G10L 15/26* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 7,243,070 B2 * | 7/2007 | Hoffmann | ............... | G10L 15/06 704/235 |
| 7,904,298 B2 * | 3/2011 | Rao | ......................... | G10L 15/22 704/243 |
| 8,355,914 B2 * | 1/2013 | Joh | ......................... | G10L 15/22 379/67.1 |

(Continued)

*Primary Examiner* — Satwant Singh

(57) ABSTRACT

According to various embodiments, a method for an electronic device includes receiving an input of a first word from a keypad, recognizing a voice input and converting the voice input into a text including a second word, in response to determining that the second word is erroneously recognized based on the first word, correcting the text by replacing the second word with the first word, and entering the corrected text. An electronic device for recognizing a voice includes a keypad configured to receive an input of a first word, a sensor configured to recognize a voice input, a controller configured to convert the voice input into a text including a second word, in response to determining that the second word is erroneously recognized based on the first word, correct the text by replacing the second word with the first word, and enter the corrected text.

18 Claims, 23 Drawing Sheets

(56) References Cited

U.S. PATENT DOCUMENTS

| | | | | |
|---|---|---|---|---|
| 8,423,351 | B2* | 4/2013 | Hughes | G06F 3/0237 704/1 |
| 9,390,715 | B2* | 7/2016 | Jeon | G06F 3/167 |
| 2007/0033026 | A1* | 2/2007 | Bartosik | G06F 17/273 704/233 |
| 2012/0215533 | A1* | 8/2012 | Aravamudan | G06F 17/30253 704/235 |
| 2012/0304057 | A1* | 11/2012 | Labsky | G10L 13/08 715/256 |
| 2013/0297318 | A1 | 11/2013 | Balasubramanyam et al. | |
| 2013/0332162 | A1* | 12/2013 | Keen | G10L 15/26 704/235 |
| 2014/0019121 | A1* | 1/2014 | Bao | G10L 15/22 704/9 |
| 2014/0019133 | A1* | 1/2014 | Bao | G10L 15/22 704/257 |
| 2015/0149163 | A1* | 5/2015 | VanBlon | G10L 15/08 704/231 |
| 2015/0193410 | A1* | 7/2015 | Jin | G06F 17/24 715/256 |
| 2016/0036961 | A1* | 2/2016 | Lee | H04M 1/271 455/418 |

* cited by examiner

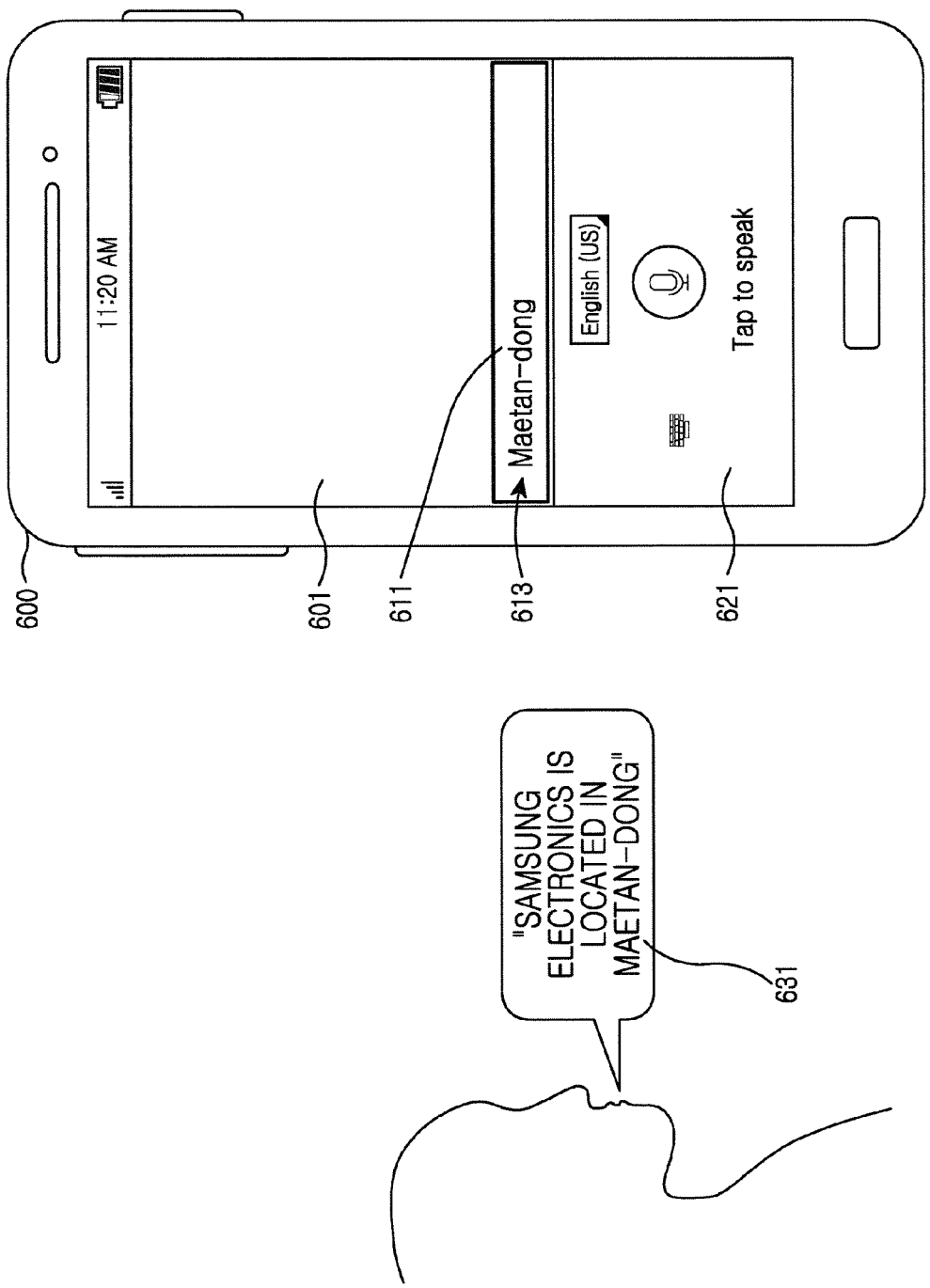

METHOD OF CONTROLLING A TEXT INPUT AND ELECTRONIC DEVICE THEREOF

CROSS-REFERENCE TO RELATED APPLICATION AND CLAIM OF PRIORITY

The present application is related to and claims the benefit under 35 U.S.C. §119(a) to Korean Application Serial No. 10-2014-0052540, which was filed in the Korean Intellectual Property Office on Apr. 30, 2014, the entire content of which is hereby incorporated by reference.

TECHNICAL FIELD

Various embodiments relate to a technology for controlling a text input associated with a voice input in an electronic device.

BACKGROUND

Electronic devices have become necessities of modern people since they are easily carried, and the electronic devices have developed as multimedia devices that provide various services such as voice and video call, message transmission and reception, information input/output function, and data transmission.

The electronic device may input text using a keypad, and may input text using voice recognition.

SUMMARY

To address the above-discussed deficiencies, it is a primary object to provide a method and apparatus for improving the accuracy of a voice input in an electronic device. Various embodiments provide a method and apparatus for receiving text that is to be used as a replacement when voice is input in an electronic device so as to improve accuracy of a text input associated with a voice input.

According to various embodiments, a method for an electronic device includes receiving an input of a first word from a keypad, recognizing a voice input and converting the voice input into a text including a second word, in response to determining that the second word is erroneously recognized based on the first word, correcting the text by replacing the second word with the first word, and entering the corrected text.

In some embodiments, the method further includes storing the first word in a database.

In some embodiments, the second text contains a misspelled portion.

In some embodiments, the keypad comprises a software keypad.

In some embodiments, the keypad comprises a function of voice recognition.

In some embodiments, the method further includes determining the second word based on a similarity to the first word.

In some embodiments, the method further includes displaying the corrected text on a screen.

An electronic device for recognizing a voice includes a keypad configured to receive an input of a first word, a sensor configured to recognize a voice input, a controller configured to convert the voice input into a text including a second word, in response to determining that the second word is erroneously recognized based on the first word, correct the text by replacing the second word with the first word, and enter the corrected text.

A non-transitory computer-readable recording medium, storing instructions that when executed, cause a processor configured to receive an input of a first word from a keypad, recognize a voice input and converting the voice input into a text including a second word, in response to determining that the second word is erroneously recognized based on the first word, correct the text by replacing the second word with the first word, and enter the corrected text.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6A to 6D illustrate screens for inputting a voice input-based text using text that is to be used as a replacement when voice is input in an electronic device, according to various embodiments of the present disclosure;

DETAILED DESCRIPTION

Figure 1:
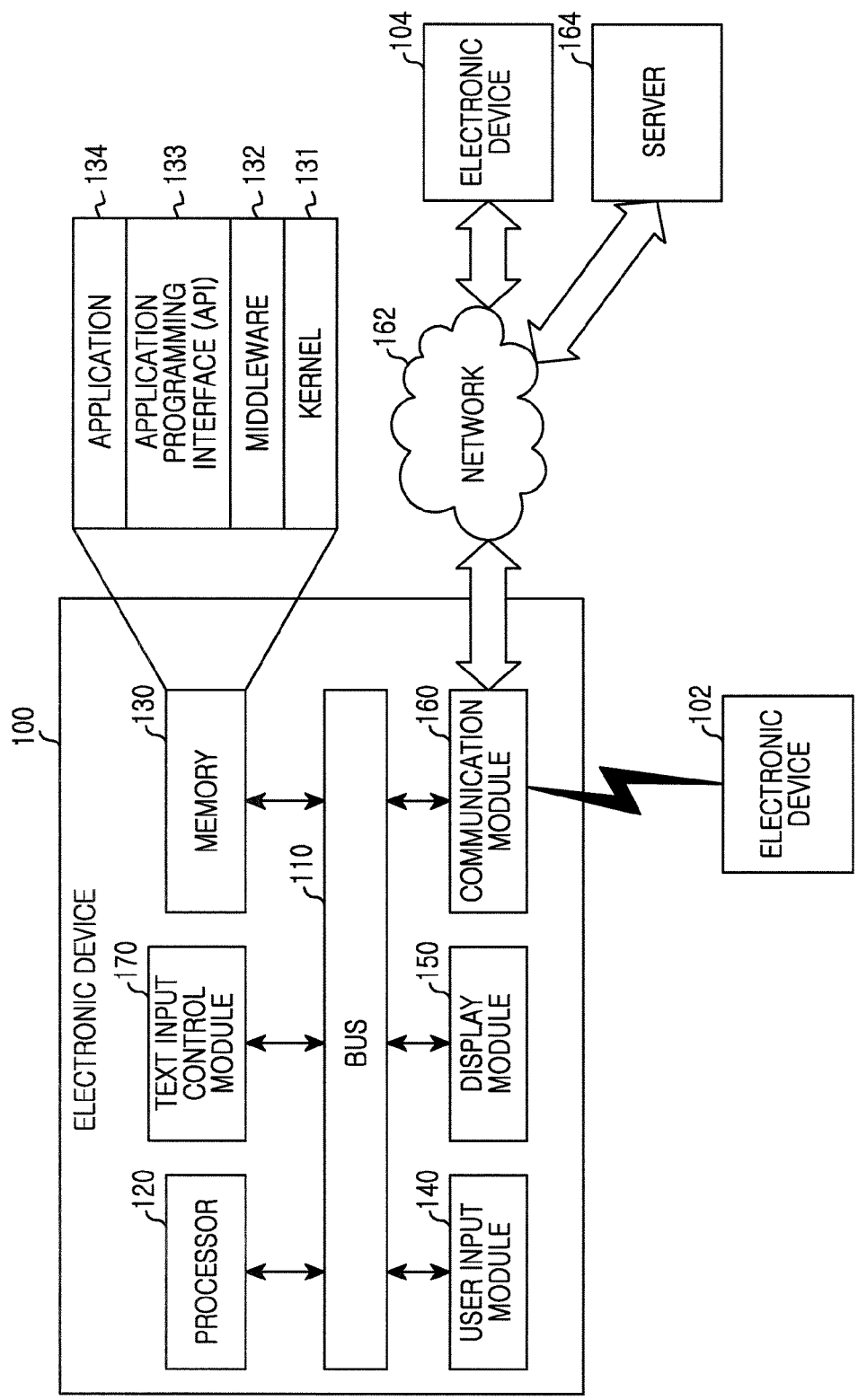
FIG. 1 illustrates a network environment including an electronic device according to various embodiments of the present disclosure.

FIGS. 1 through 10G, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic devices.

The term "include" or "may include" refers to the existence of a corresponding disclosed function, operation or component which can be used in various embodiments of the present disclosure and does not limit one or more additional functions, operations, or components. Further, as used in embodiment of the present disclosure, the terms "include", "have" and their conjugates may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In various embodiments, the expression "or" includes any or all combinations of words enumerated together. For example, the expression "A or B" may include A, may include B, or may include both A and B.

The expression "1", "2", "first", or "second" used various embodiments of the present disclosure may modify various components of various embodiments but does not limit the corresponding components. For example, the above expressions do not limit the sequence and/or importance of the corresponding elements. The expressions may be used to distinguish a component element from another component element. For example, a first user device and a second user device indicate different user devices although both of them are user devices. For example, a first element may be termed a second element, and similarly, a second element may be termed a first element without departing from the scope of the present disclosure.

It should be noted that if it is described that one component element is "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

As used herein, terms are used merely for describing specific embodiments and are not intended to limit the present disclosure. As used herein, singular forms may include plural forms as well unless the context clearly indicates otherwise.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to various embodiments of the present disclosure can be a device including a voice function. For example, the electronic device can include at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a head-mounted-device (HMD) such as electronic glasses, electronic clothes, an electronic bracelet, an electronic necklace, an electronic appcessory, an electronic tattoo, or a smart watch).

According to some embodiments, the electronic device can be a smart home appliance with a finger print function. The smart home appliance as an example of the electronic device can include at least one of, for example, a television, a Digital Video Disk (DVD) player, an audio system, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic picture frame.

According to some embodiments, the electronic device can include at least one of various medical devices such as a magnetic resonance angiography (MRA) scanner, a magnetic resonance imaging (MRI) scanner, a computed tomography (CT) scanner, a scanner, an ultrasonograph, or the like, a navigation device, a Global Positioning System (GPS) receiver, an Event Data Recorder (EDR), a Flight Data Recoder (FDR), a vehicle infotainment device, an electronic equipment for ship (for example a ship navigation device and gyro-compass and the like, avionics, a security device, a head unit for vehicle, an industrial or household robot, ATM(automatic teller machine) in banking facilities or POS(point of sales) in stores.

According to another embodiment, the electronic devices can include at least one of furniture or a part of a building/structure having a communication function, electronic boards, electronic signature receiving devices, projectors, or various measuring equipment (e.g., equipment for a water supply, an electricity, gases or radio waves). The electronic device according to various embodiments of the present disclosure can be a combination of one or more of the aforementioned various devices. Also, the electronic device according to the present disclosure can be a flexible device. Further, it is obvious to those skilled in the art that the electronic device according to the present disclosure is not limited to the aforementioned devices.

Hereinafter, an electronic device according to various embodiments of the present disclosure will be described with reference to the accompanying drawings. In various embodiments, the term "user" can indicate a person using an electronic device or a device (e.g. an artificial intelligence electronic device) using an electronic device.

FIG. 1 illustrates a network environment 100 including an electronic device 100 according to various embodiments of the present disclosure. Referring to FIG. 1, the electronic device 100 can include a bus 110, a processor 120, a memory 130, a user input module 140, a display module 150, or a communication module 160, and a text input control module 170.

The bus 110 can be a circuit to connect the above-described components with one another and to transfer communication (for example, control messages) among the above-described components.

For example, the processor 120 can receive instructions from the aforementioned other components (for example, the memory 130, the user input module 140, the display module 150, the communication module 160, the text input control module 170, and the like) through the bus 110, decipher the received instructions, and perform calculations or data processing according to the deciphered instructions.

The memory 130 can store instructions or data which are received from the processor 120 or other components (for example, the user input module 140, the display module 150, the communication module 160, the text input control module 170, and the like) or created by the processor 120 or other elements. The memory 130 can include programming modules such as a kernel 131, a middleware 132, an Application Programming Interface (API) 133, applications 134, and the like. Each of the aforementioned programming modules can be formed of software, firmware, hardware, or a combination of at least two thereof.

The kernel 131 can control or manage system resources (for example, the bus 110, the processor 120, the memory 130, and the like) used to perform operations or functions implemented in the remaining programming modules, for example, the middleware 132, the API 133, and the applications 134. In addition, the kernel 131 can provide an interface through which the middleware 132, the API 133, or the applications 134 can access the individual components of the electronic device 100 to control or manage them.

The middleware 132 can serve as an intermediary such that the API 133 or the applications 134 communicate with the kernel 131 to transfer and receive data. Further, in relation to requests for operations received from the applications 134, the middleware 132 can control (for example, scheduling or load-balancing) the requests by using, for example, a method of determining sequence for using system resources (for example, the bus 110, the processor 120, the memory 130, or the like) of the electronic device 100 with respect to at least one application among the applications 134.

The API 133 is an interface by which the application 134 controls functions provided from the kernel 131 or the middleware 132, and can include, for example, at least one interface or function (for example, instructions) for file control, window control, image processing, text control, or the like.

According to the various embodiments of the present disclosure, the applications 134 can include a Short Message Service (SMS)/Multimedia Message Service (MMS) application, an e-mail application, a calendar application, an alarm application, a health care application (for example, an application for measuring a work rate or a blood sugar), an environment information application (for example, an application for providing atmospheric pressure, humidity, or temperature information). Additionally or alternatively, the application 134 can be an application related to the information exchange between the electronic device 100 and an external electronic device (for example, an electronic device 104). The application related to the information exchange can include, for example, a notification relay application for transferring particular information to the external electronic device or a device management application for managing the external electronic device.

For example, the notification relay application can include a function of transferring notification information generated in other applications (for example, the SMS/MMS application, the e-mail application, the health care application, or the environmental information application) of the electronic device 100 to an external electronic device (for example, the electronic device 104). Additionally or alternatively, the notification relay application can, for example, receive notification information from an external electronic device (for example, the electronic device 104), and can provide the received notification information to a user. The device management application can manage (for example, install, delete, or update), for example, at least some functions (for example, turning external electronic device (or some elements) on or off, or adjusting the brightness (or resolution) of a display) of an external electronic device (for example, the electronic device 104) that communicates with the electronic device 100, applications performed in the external electronic device, or services (for example, a phone call service, or a messaging service) provided in the external electronic device.

According to various embodiments, the application 134 can include applications, which are designated according to the property (for example, the type of electronic device) of the external electronic device (for example, the electronic device 104). For example, when an external electronic device is an MP3 player, the applications 134 can include an application related to reproduction of music. Similarly, when an external electronic device is a mobile medical device, the application 134 can include an application related to health care. According to an embodiment of the present disclosure, the application 134 can include at least one of an application designated for the electronic device 100 and an application received from external electronic devices for example, the server 164, or the electronic device 104).

The user input module 140 can transmit a command or data input from a user through an input/output device (for example, a sensor, a keyboard, or a touch screen) to the processor 120, the memory 130, the communication module 160, or the text input control module 170 through, for example, the bus 110. For example, the user input module 140 can provide, to the processor 120, data associated with a user's touch which is entered from the touch screen. Further, through the input/output device (for example, a speaker or a display), the user input module 140 can output commands or data received from the processor 120, the memory 130, the communication module 160, or the text input control module 170 through the bus 110. For example, the user input module 140 can output voice data processed through the processor 120 to a user through a speaker.

The display module 150 can display various pieces of information (for example, multimedia data or text data) to a user.

The communication module 160 can connect communication between the electronic device 100 and an external electronic device (for example, the electronic device 104 or the server 164). For example, the communication module 160 can be connected to a network 162 through wireless or wired communication to communicate with the external device. The wireless communication can include at least one of, for example, Wireless Fidelity (Wi-Fi), Bluetooth (BT), Near Field Communication (NFC), a Global Positioning System (GPS), and cellular communication (for example, Long Term Evolution (LTE), Long Term Evolution-Advanced (LTE-A), Code Division Multiple Access (CDMA), Wideband CDMA (WCDMA), Universal Mobile Telecommunication System (UMTS), Wireless Broadband (WiBro), or Global System for Mobile communication (GSM)). The wired communication can include at least one of, for example, a Universal Serial Bus (USB), a High Definition Multimedia Interface (HDMI), Recommended Standard 232 (RS-232), and a Plain Old Telephone Service (POTS).

According to an embodiment of the present disclosure, the network 162 can be a telecommunication network. The communication network can include at least one of a computer network, the Internet, the Internet of things, and a telephone network. According to an embodiment of the present disclosure, protocols (for example, a transport layer protocol, a data link layer protocol, or a physical layer protocol) for communication between the electronic device 100 and external electronic devices can be supported by at least one of the application 134, the API 133, the middleware 132, the kernel 131, and the communication module 160.

The text input control module 170 can process at least a part of the information obtained from other components (for example, processor 120, memory 130, the user input module 140, or communication module 160) and provide the processed information to a user in various ways. For example, the text input control module 170 can control at least a part of the functions of the electronic device 100 so that the electronic device 100 controls inputting a voice input-based text, using the processor 120 or independently from the processor 120. According to an embodiment of the present disclosure, at least one component of the text input control module 170 can be included in the server 164, and at least one operation implemented in the text input control module 170 can be supported by the server 164. Additional information associated with the text input control module 170 is provided through FIG. 2 described below.

Figure 2:
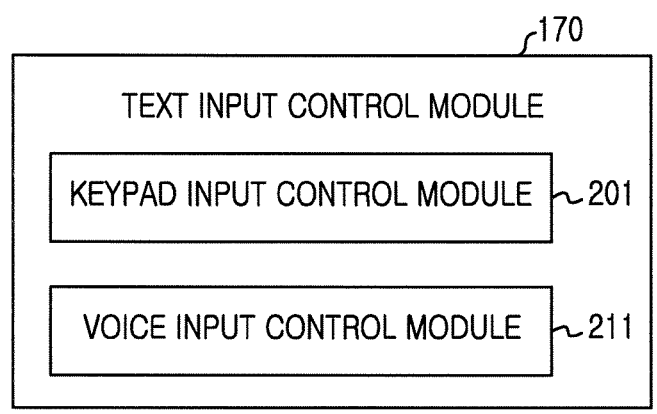
FIG. 2 is a block diagram of a text input control module of an electronic device according to various embodiments of the present disclosure.

FIG. 2 is a block diagram of the text input control module 170 of an electronic device (for example, the electronic device 100), according to various embodiments.

Referring to FIG. 2, the text input control module 170 can include keypad input control module 201 and a voice input control module 211.

For example, when a keypad input is detected by the user input module 140, the keypad input control module 201 can execute a control to display text corresponding to the input key through the display module 150.

For example, when a voice input is detected by the user input module 140, the voice input control module 211 can execute a control to display text corresponding to the voice input through the display module 150.

According to an embodiment of the present disclosure, when a text input event occurs, the keypad input control module 201 can recognize text input through a keypad as text that is to be used as a replacement when voice is input. When a voice input event occurs, the voice input control module 211 analyzes the voice input, and provides text to the text input control module 170. The text input control module 170 compares the text provided through the voice input control module 211 and the text provided through the keypad input control module 210, so as to determine a part similar to the text provided through the keypad input control module 201, and determines text to be displayed in the display module 150.

According to an embodiment of the present disclosure, when a voice input event occurs, the voice input control module 211 analyzes a voice input, and provides text to the text input control module 170. When a text input event occurs, the keypad input control module 201 can recognize text input through the keypad as text that is to replace text obtained through analysis of a voice input. The text input control module 170 compares the text provided through the voice input control module 211 and the text provided through the keypad input control module 201, so as to determine apart similar to the text provided through the keypad input control module 201, and determines text to be displayed in the display module 150.

Figure 3:
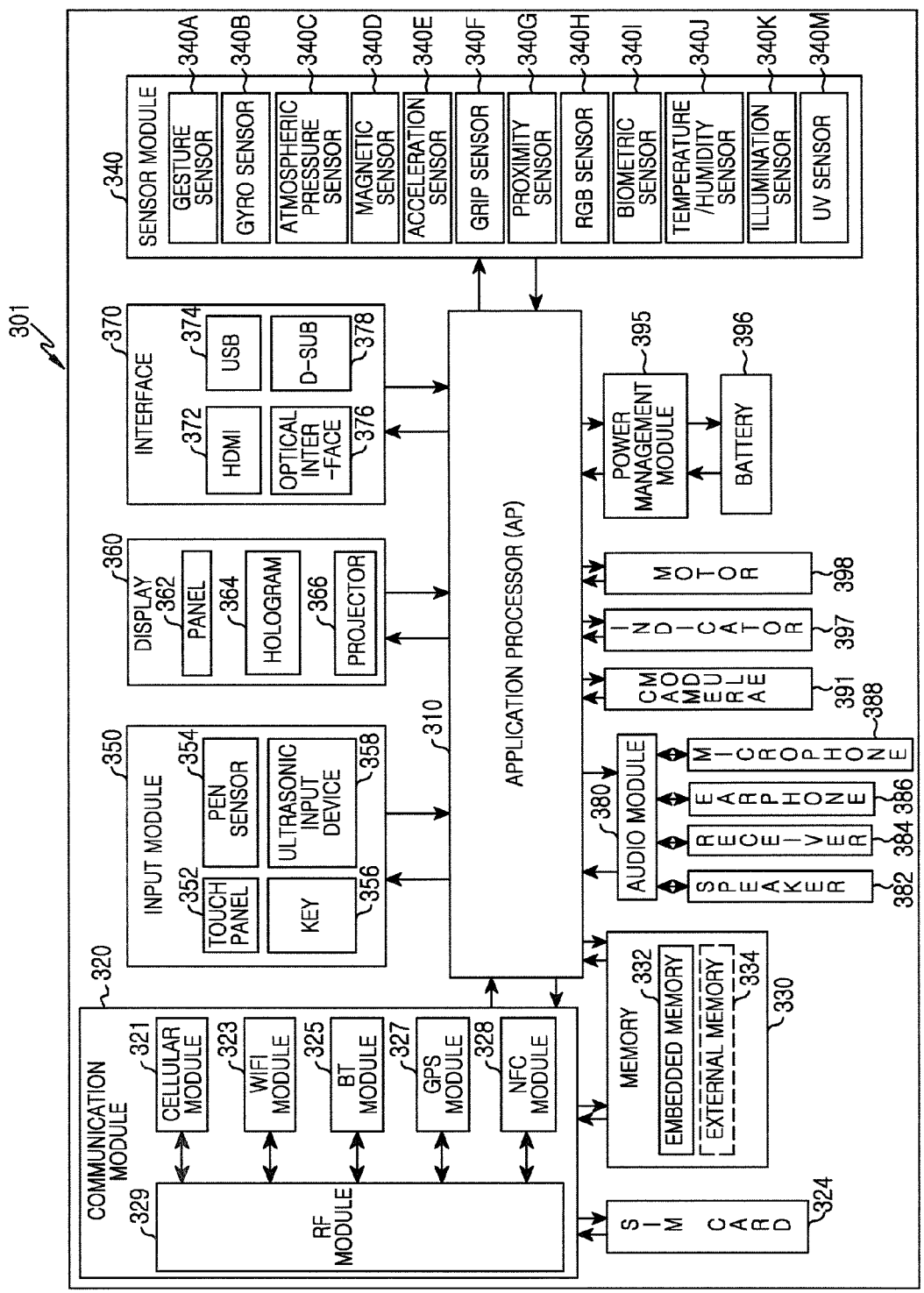
FIG. 3 is a block diagram of an electronic device according to various embodiments of the present disclosure.

FIG. 3 is a block diagram of an electronic device 301 according to various embodiments of the present disclosure. The electronic device 301 can form, for example, apart or the entirety of the electronic device 100 illustrated in FIG. 1. Referring to FIG. 3, the electronic device 301 can include at least one Application Processor (AP) 310, a communication module 320, a Subscriber Identifier Module (SIM) card 324, a memory 330, a sensor module 340, an input device 350, a display 360, an interface 370, an audio module 380, a camera module 391, a power management module 395, a battery 396, an indicator 397, and a motor 398.

The AP 310 can control a plurality of hardware or software components connected to the AP 310 by driving an operating system or an application program, process various types of data including multimedia data, and perform calculations. The AP 310 can be embodied as, for example, a System on Chip (SoC). According to an embodiment of the present disclosure, the AP 310 can further include a Graphic Processing Unit (GPU) (not illustrated).

The communication module 320 (for example, the communication module 160) can perform data transmission/reception in communication between the electronic device 301 (for example, the electronic device 100) and other electronic devices (for example, the electronic device 104 and the server 164) connected over a network. According to an embodiment of the present disclosure the communication module 320 can include a cellular module 321, a WiFi module 323, a BlueTooth (BT) module 325, a Global Positioning System (GPS) module 327, a Near Field Communication (NFC) module 328, and a Radio Frequency (RE) module 329.

The cellular module 321 can provide a voice call, a video call, an SMS service, an Internet service, and the like through a communication network (for example, LTE, CDMA, WCDMA, UMTS, WiBro, or GSM). Also, the cellular module 321 can identify and authenticate an electronic device in a communication network using, for example, a subscriber identification module (for example, the SIM card 324). According to an embodiment of the present disclosure, the cellular module 321 can perform at least some functions which the AP 310 can provide. For example, the cellular module 321 can perform at least a part of the multimedia control function.

According to an embodiment of the present disclosure, the cellular module 321 can include a Communication Processor (CP). Furthermore, the cellular module 321 can be embodied as, for example, an SoC. Although the components, such as the cellular module 321 (for example, the communication processor), the memory 330, the power management module 395, and the like are illustrated to be separate from the AP 310 in FIG. 3, the AP 310 can be embodied by including at least some of the above described components (for example, the cellular module 321) according to an embodiment of the present disclosure.

According to an embodiment of the present disclosure, the AP 310 or the cellular module 321 (for example, a communication processor) can load, to a volatile memory, commands or data received from at least one of a non-volatile memory and other component elements connected thereto, and can process the loaded commands or data. Furthermore, the AP 310 or the cellular module 321 can store, in a non-volatile memory, data received from or generated by at least one of the other components.

Each of the Wi-Fi module 323, the BT module 325, the GPS module 327, or the NFC module 328 can include, for example, a processor for processing data transmitted/received through the corresponding module. Although the cellular module 321, the Wi-Fi module 323, the BT module 325, the GPS module 327, and the NFC module 328 are illustrated as individual blocks in FIG. 3, according to an embodiment of the present disclosure, at least some (for example, two or more) of the cellular module 321, the Wi-H module 323, the BT module 325, the GPS module 327, and the NEC module 328 can be included within one Integrated Chip (IC) or one IC package. For example, at least some of processors corresponding to the cellular module 321, the WiFi module 323, the BT module 325, the GPS module 327, and the NFC module 328 respectively (for example, a CP corresponding to the cellular module 321 and a WiFi processor corresponding to the WiFi module 323) can be embodied as one SoC.

The RF module 329 can transmit/receive data, for example, an RF signal Although not illustrated, the RF module 329 can include, for example, a transceiver, a Power Amp Module (PAM), a frequency filter, a Low Noise Amplifier (LNA) or the like. Furthermore, the RF module 329 can further include a component for transmitting/receiving electronic waves over a free air space in wireless communication, for example, a conductor, a conducting wire or the like. Although the cellular module 321, the Wi-Fi module 323, the BT module 325, the GPS module 327, and the NFC module 328 are illustrated to share one RF module 329 in FIG. 3, at least one of the cellular module 321, the Wi-E module 323, the BT module 325, the GPS module 327, and the NFC module 328 can transmit/receive an RF signal through a separate RF module.

The SIM card 324 can be a card including a subscriber identification module and can be inserted into a slot formed in a particular portion of the electronic device. The SIM card 324 can include unique identification information (for example, an integrated Circuit Card IDentifier (ICCID)) or subscriber information (for example, an International Mobile Subscriber IDentity (IMSI)).

The memory 330 (for example, memory 130) can include an embedded memory 332 or an external memory 334. The embedded memory 332 can include at least one of a volatile memory (for example, a Dynamic Random Access Memory (DRAM), a Static RAM (SRAM), and a Synchronous Dynamic RAM (SDRAM)) and a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, and a NOR flash memory).

According to an embodiment of the present disclosure, the embedded memory 332 can be a Solid State Drive (SSD). The external memory 334 can further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 334 can be functionally connected to the electronic device 301 through various interfaces. According to an embodiment of the present disclosure, the electronic device 301 can further include a storage device or storage medium), such as a hard drive.

The sensor module 340 can measure a physical quantity or detect an operating state of the electronic device 301, and convert the measured or detected information into an electronic signal. The sensor module 340 can include at least one of, for example, a gesture sensor 340A, a gyro sensor 340B, an atmospheric pressure sensor 340C, a magnetic sensor 340D, an acceleration sensor 340E, a grip sensor 340F, a proximity sensor 340G, a color sensor 340H (for example, a Red/Green/Blue (RGB) sensor), a biometric sensor 340I, a temperature/humidity sensor 340J, an illumination sensor 340K, and an Ultra Violet (UV) sensor 340M. Additionally or alternatively, the sensor module 340 can include, for example, an E-nose sensor (not illustrated), an ElectroMyoGraphy (EMG) sensor (not illustrated), an EtectroEncephaloGram (EEG) sensor (not illustrated), an FlectroCardioGram (ECG) sensor (not illustrated), an InfraRed (IR) sensor (not illustrated), an iris sensor (not illustrated), or a fingerprint sensor (not illustrated). The sensor module 340 can further include a control circuit for controlling at least one sensor included therein.

The input device 350 can include a touch panel 352, a (digital) pen sensor 354, a key 356, or an ultrasonic input device 358. The touch panel 352 can recognize a touch input through at least one of, for example, a capacitive type, a resistive type, an infrared type, and an ultrasonic type. The touch panel 352 can further include a control circuit. In case of the capacitive type touch panel, physical contact or proximity recognition is possible. The touch panel 352 can further include a tactile layer. In this case, the touch panel 352 can provide a tactile reaction to a user.

The (digital) pen sensor 354 can be implemented, for example, using the same or similar method to receiving a user's touch input or using a separate recognition sheet. The key 356 can include, for example, a physical button, an optical key or a keypad. The ultrasonic input device 358 is a unit that identifies data by generating an ultrasonic signal through an input tool and detecting a sonic wave through a microphone (for example, microphone 388) in the electronic device 301, and is capable of wireless recognition. According to an embodiment of the present disclosure, the electronic device 301 can also receive a user input from an external device (for example, a computer or server) connected thereto, using the communication module 320.

The display 360 (for example, the display module 150) can include a panel 362, a hologram device 364, and a projector 366. The panel 362 can be, for example, a Liquid Crystal Display (LCD), an Active Matrix Organic Light Emitting Diode (AM-OLED), or the like. The panel 362 can be embodied to be, for example, flexible, transparent, or wearable. The panel 362 can also be configured as one module together with the touch panel 352. The hologram device 364 can show a stereoscopic image in the air by using interference of light. The projector 366 can project light onto a screen to display an image. For example, the screen can be located inside or outside the electronic device 301. According to an embodiment of the present disclosure, the display 360 can further include a control circuit for controlling the panel 362, the hologram device 364, or the projector 366.

The interface 370 can include, for example, a High-Definition Multimedia interface (HDMI) 372, a Universal Serial Bus (USB) 374, an optical interface 376, or a D-sub-miniature (D-sub) 378. The interface 370 can be included in, for example, the communication module 160 illustrated in FIG. 1. Additionally or alternatively, the interface 370 can include, for example, a Mobile High-definition Link (MHL) interface, a Secure Digital (SD) card/Multi-Media Card (MMC) interface, or an Infrared Data Association (IrDA) standard interface.

The audio module 380 can bilaterally convert a sound and an electronic signal. At least some elements of the audio module 380 can be included in, for example, the user input module 140 illustrated in FIG. 1. The audio module 380 can process voice information input or output through, for example, a speaker 382, a receiver 384, earphones 386, the microphone 388, or the like.

The camera module 391 is a device which photographs a still image and a video. According to an embodiment of the present disclosure, the camera module 391 can include one or more image sensors (for example, a front lens or a back lens), a lens (not shown), an Image Signal Processor (ISP) (not shown) or a flash (not shown) (for example, LED or xenon lamp).

The power management module 395 can manage electric power of the electronic device 301. Although not illustrated, the power management module 395 can include, for example, a Power Management Integrated Circuit (PMIC), a charger Integrated Circuit (IC), or a battery or fuel gauge.

The PMIC can be mounted to, for example, an integrated circuit or an SoC semiconductor. Charging methods can be classified into a wired charging method and a wireless charging method. The charger IC can charge a battery and prevent over voltage or over current from occurring in a charger. According to an embodiment of the present disclosure, the charger IC can include a charger IC for at least one of the wired charging method and the wireless charging method. Examples of the wireless charging method can include a magnetic resonance type, a magnetic induction type, or an electromagnetic wave type, and an additional circuit for wireless charging, such as a coil loop circuit, a resonance circuit, or a rectifier circuit can be added.

The battery gauge can measure, for example, the remaining amount of the battery 396, a charging voltage and current, or temperature. The battery 396 can store or generate electricity and supply power to the electronic device 301 using the stored or generated electricity. The battery 396 can include, for example, a rechargeable battery or a solar battery.

The indicator 397 can indicate particular states (for example, a booting state, a message state, a charging state, and the like) of the electronic device 301 or a part (for example, the AP 310) of the electronic device 301. The motor 398 can convert an electrical signal into mechanical vibration. Although not illustrated, the electronic device 301 can include a processing unit (for example, a GPU) for supporting a mobile TV. The processing unit for supporting the mobile TV can process media data according to a standard of Digital Multimedia Broadcasting (DMB), Digital Video Broadcasting (DVB), media flow or the like.

According to various embodiments, an electronic device for controlling a text input can include a processor that detects an input of a first text, detects a voice input, executes voice recognition with respect to the detected voice so as to detect a second text corresponding to the detected voice, and converts at least a part of the second text into the first text.

According to various embodiments, the processor can detect text similar to the first text from the second text, and can convert, into the first text, the text similar to the first text, in the second text.

According to various embodiments, the electronic device can further include a display unit that converts at least a part of the second text into the first text and displays the same.

According to various embodiment, a computer-readable recording medium that stores instructions can be a computer-readable recording medium that records a program for implementing operations, the operations including detecting an input of a first text, detecting a voice input, executing voice recognition with respect to the detected voice so as to detect a second text corresponding to the detected voice, and converting at least a part of the second text into the first text.

The aforementioned elements of the electronic device according to various embodiments of the present disclosure can be constituted by one or more components, and the name of the corresponding element can vary with a type of electronic device. The electronic device according to the present disclosure can be configured by including at least one of the above-described elements, and some of the elements can be omitted, or other elements can be added. In addition, a single entity constituted by combining some elements of the electronic device according to the various embodiments of the present disclosure can equivalently perform functions of the corresponding elements prior to the combination thereof.

The term "module" used in the present disclosure can refer to, for example, a unit including one or more combinations of hardware, software, and firmware. The "module" can be interchangeable with a term, such as a unit, a logic, a logical block, a component, or a circuit. The "module" can be a minimum unit of an integrated component element or a part thereof. The "module" can be a minimum unit for performing one or more functions or a part thereof. The "module" can be mechanically or electronically implemented. For example, the "module" according to the present disclosure can include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least a part of a device (for example, modules or functions thereof) or a method (for example, operations) according to the various embodiments of the present disclosure can be embodied by, for example, a command stored in a computer readable storage medium in a form of a programming module. When the command is executed by one or more processors (for example, the processor 120), the one or more processors can execute a function corresponding to the command. The computer-readable storage medium can be, for example, the memory 130. At least some of the programming modules can be implemented (for example, executed) by, for example, the processor 120. At least a part of the programming module can include, for example, a module, a program, a routine, a set of instructions and/or a process for performing one or more functions.

The computer readable recoding medium can include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program instruction (for example, a programming module), such as a Read Only Memory (ROM), a Random Access Memory (RAM), a flash memory, and the like. In addition, the program instructions can include high class language codes, which can be executed in a computer by using an interpreter, as well as machine codes made by a compiler. The aforementioned hardware device can be configured to operate as one or more software modules in order to perform the operation of the present disclosure, and vice versa.

Figure 4:
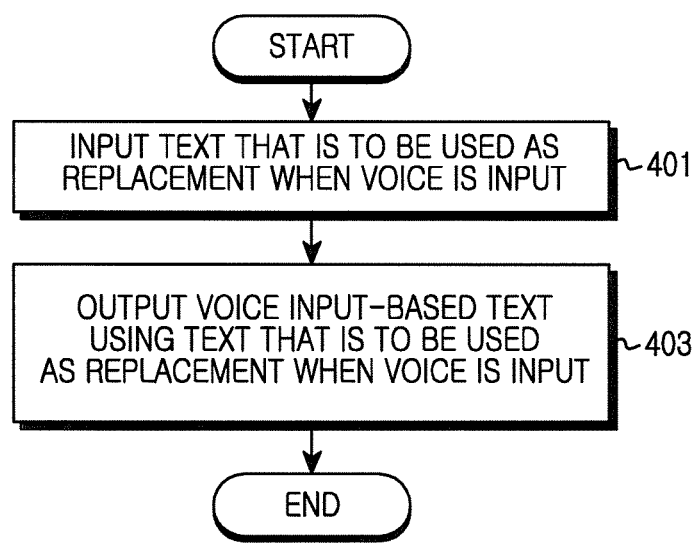
FIG. 4 illustrates a procedure of inputting a voice input-based text using text that is to be used as a replacement when voice is input in an electronic device, according to various embodiments of the present disclosure.

FIG. 4 illustrates a procedure of inputting a voice input-based text using a text that is to be used as a replacement when voice is input in an electronic device, according to various embodiments of the present disclosure.

Figure 6A:
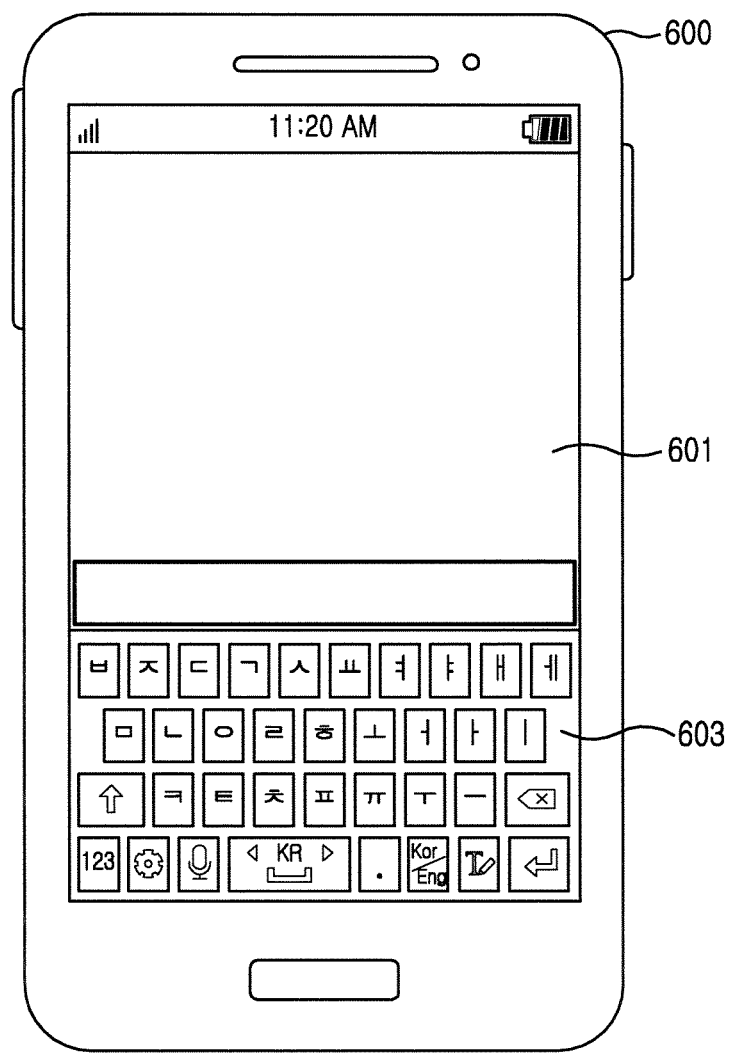
Figure 6B:
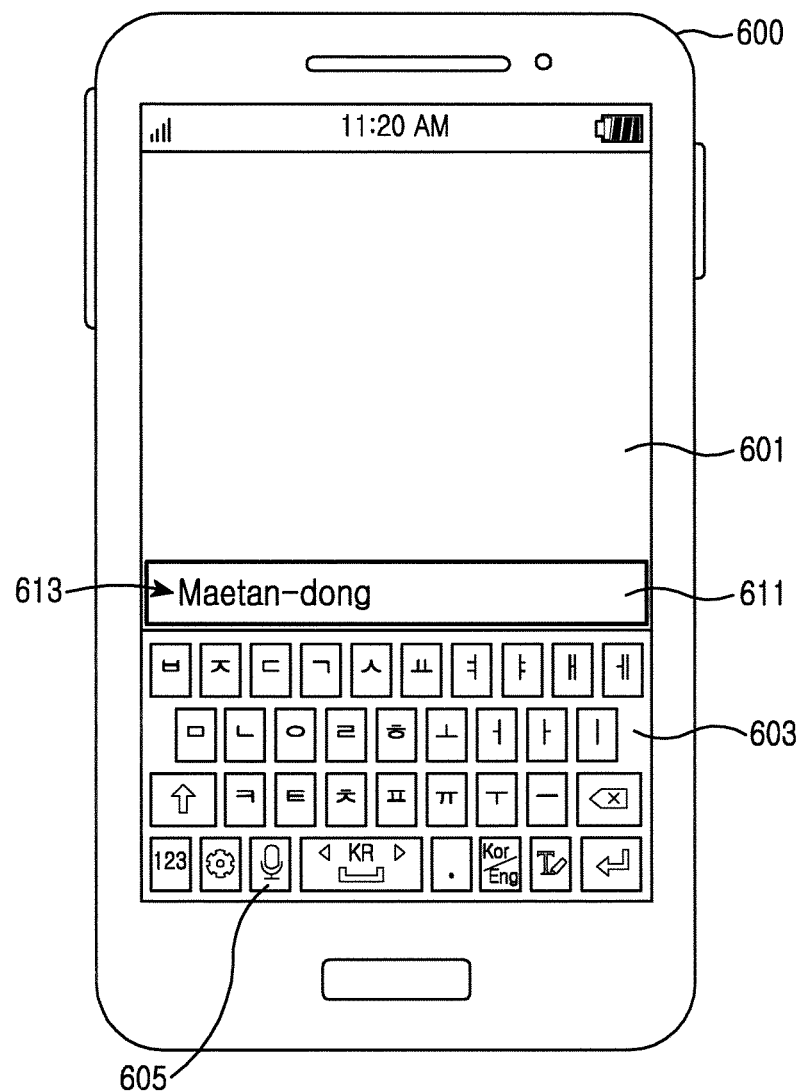

Referring to FIG. 4, an electronic device receives an input of a text that is to be used as a replacement when voice is input, in operation 401. For example, as illustrated in FIG. 6B, when "Maetan-dong" 613 is input through a keypad 603 in an application program 601 that provides a text input, an electronic device 600 can recognize "Maetan-dong" 613 input through the keypad 603 as a text that is to be used as a replacement when voice is input. According to an embodiment of the present disclosure the electronic device can receive at least one piece of a text that is to be used as a replacement when voice is input, through an input window 611 for receiving a text that is to be used as a replacement when voice is input.

Figure 6D:
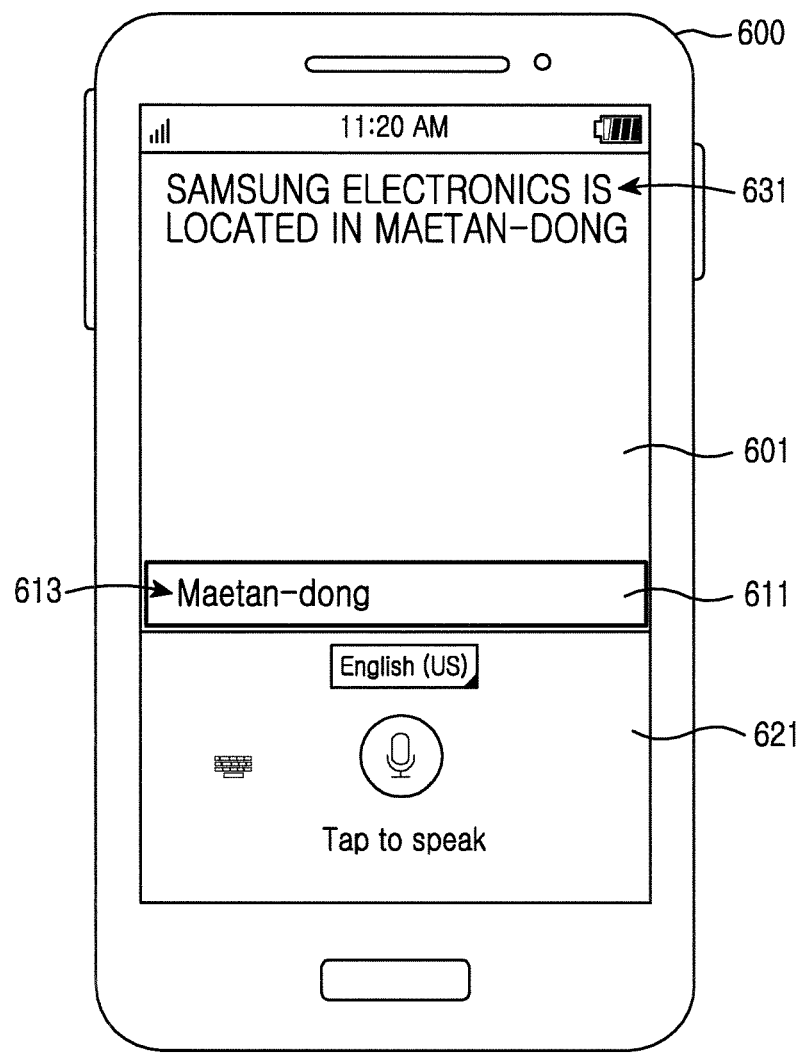

In operation 403, the electronic device can output a voice input-based text using a text that is to be used as a replacement when voice is input. For example, as illustrated in FIG. 6C, when a voice input spoken by a user such as "Samsung Electronics is located in Maetan-dong" 631, the electronic device 600 can output "Samsung Electronics is located in Maetan-dong" in the application program 601 as illustrated in FIG. 6D, based on the voice input and "Maetan-dung" 613 input text that is to be used as a replacement when voice is input.

Figure 5:
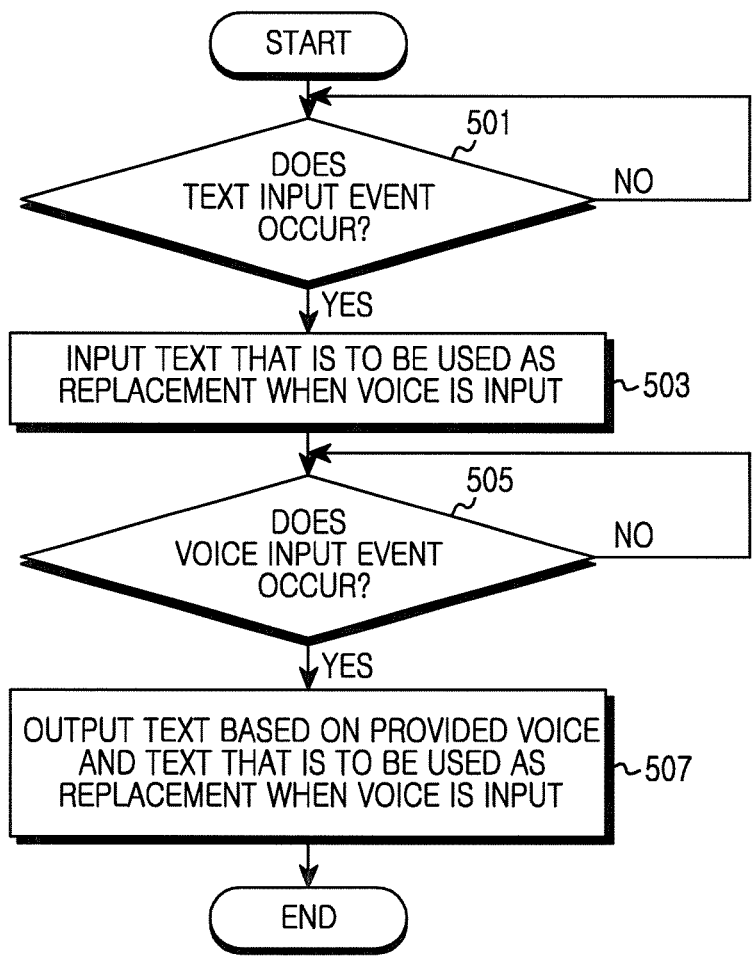
FIG. 5 illustrates a procedure of inputting a voice input-based text using text that is to be used as a replacement when voice is input in an electronic device, according to various embodiments of the present disclosure.

FIG. 5 illustrates a procedure of inputting a voice input-based text using a text that is to be used as a replacement when voice is input in an electronic, according to various embodiments of the present disclosure.

Referring to FIG. 5, an electronic device determines whether a text input event occurs, in operation 501. For example, as illustrated in FIG. 6A, the electronic device 600 can determine whether a text input is provided through the keypad 603 in the application program 601 for providing a text input. According to an embodiment of the present disclosure, the electronic device can determine whether at least one event for inputting text occurs from among menu selection, gesture detection, and button inputting.

When a text input event occurs, the electronic device can input text that is to be used as a replacement when voice is input in operation 503. For example, as illustrated in FIG. 6B, when "Maetan-dong" 613 is input through the keypad 603 in the application program 601 that provides a text input, the electronic device 600 can recognize "Maetan-dong" 613 input through the keypad 603 as a text that is to be used as a replacement when voice is input. According to an embodiment of the present disclosure the electronic device can receive at least one piece of a text that is to be used as a replacement when voice is input, through the input window 611 for receiving text that is to be used as a replacement when voice is input.

In operation 505, the electronic device can determine whether a voice input event occurs. For example, as illustrated in FIG. 6D, when a voice input icon 605 included in the keypad 603 is selected in the application program 601 for providing a text input, the electronic device can operate a microphone on as to detect a voice input. According to an embodiment of the present disclosure the electronic device can determine whether at least one event for inputting voice from among menu selection, gesture detection, and button inputting, occurs in the application program 601, in addition to inputting the voice input icon 605 included in the keypad 603.

When a voice input event occurs, the electronic device can output text based on the text that is to be used as a replacement when voice is input and an inputted voice, in operation 507. For example, as illustrated in FIG. 6C, when a voice input spoken by a user such as "Samsung Electronics is located in Maetan-dong" 631, the electronic device 600 can input "Samsung Electronics is located in Maetan-dong" in the application program 601 as illustrated in FIG. 6D, based on "Maetan-dong" 613 input as a text that is to be used as a replacement when voice is input and the provided voice is input.

According to an embodiment of the present disclosure, when a voice input spoken by a user such as "Samsung Electronics is located in Maetan-dong" 631, the electronic device can have an error such as "Samsung Electronics is located in Maetang-dong" by erroneously recognizing "Maetan-dong" as "Maetang-dong." In this instance, "Maetang-dong" can be re-recognized as "Maetan-dong" by determining whether a text similar to "Maetang-dong" exists in a text that is to be used as a replacement when voice is input. In addition, the electronic device stores, in a database, "Maetan-dong" input as a text that is to be used as a replacement when voice is input, so that "Maetan-dong" is recognized without inputting a text that is to be used as a replacement when voice is input, for hereafter cases.

Figure 7:
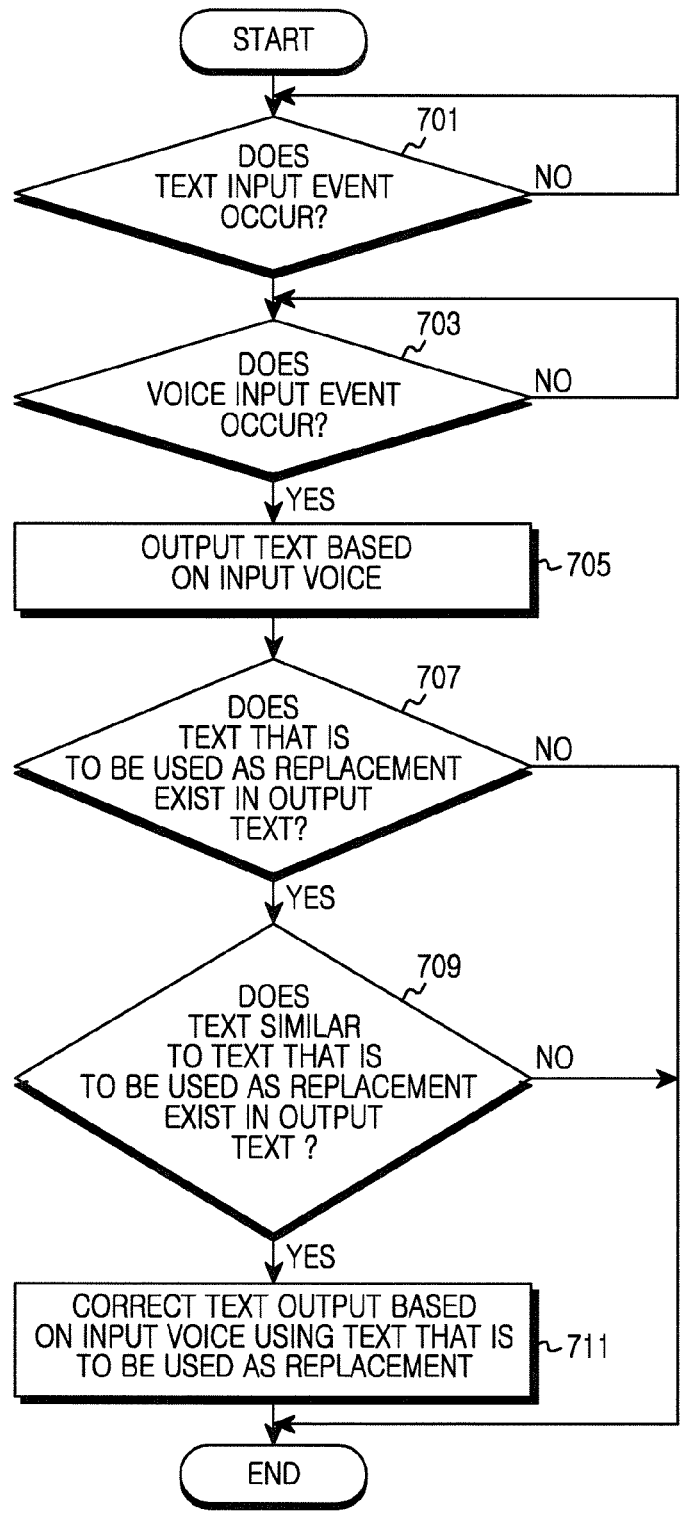
FIG. 7 illustrates a procedure of correcting a voice input-based text in an electronic device, according to various embodiments of the present disclosure.

FIG. 7 illustrates a procedure of correcting voice input-based text in an electronic device, according to various embodiments of the present disclosure.

Figure 8A:
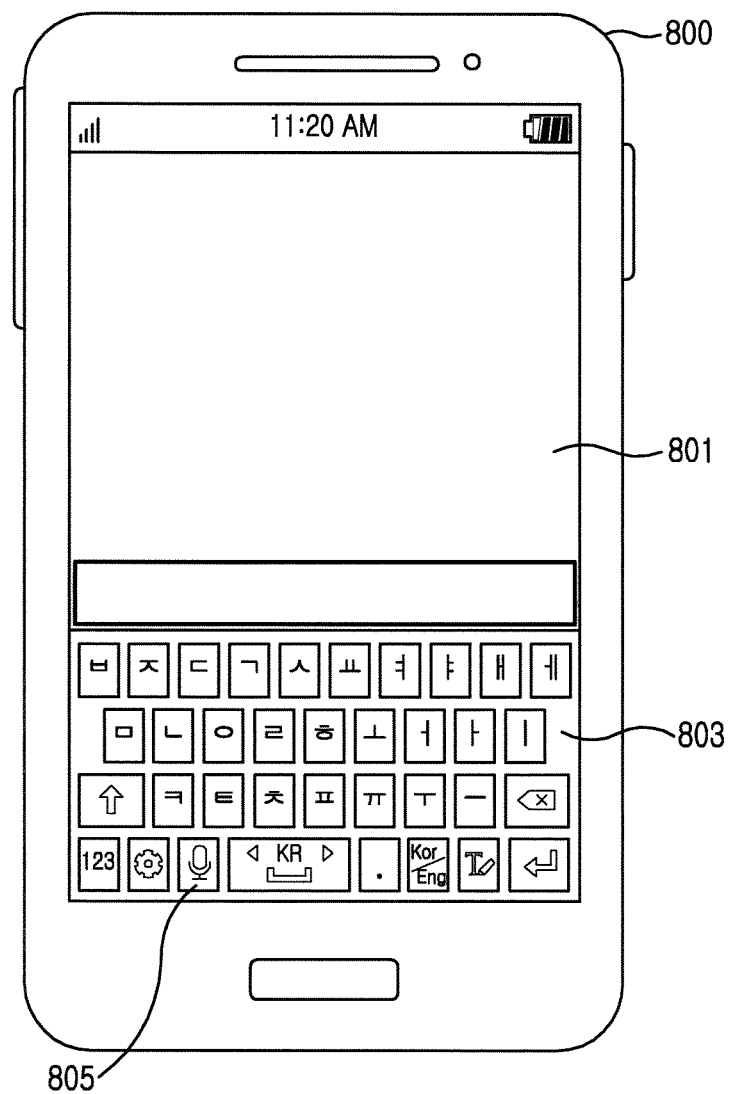
FIG. 8A to 8E illustrate configurations of a screen for correcting a voice input-based text in an electronic device according to various embodiments of the present disclosure.

Referring to FIG. 7, an electronic device determines whether a text input event occurs, in operation 701. For example, as illustrated in FIG. 8A, an electronic device 800 can determine whether a keypad call event for inputting text occurs in an application program 801 for providing a text input. According to an embodiment of the present disclosure, the electronic device can determine whether at least one event for inputting text from among menu selection, gesture detection, and button inputting, occurs.

When a text input event occurs, the electronic device can determine whether a voice input event occurs, in operation 703. For example, as illustrated in FIG. 8A, when a voice input icon 805 included in a keypad 803 is selected in the application program 801 for providing a text input, the electronic device can operate a microphone so as to detect a voice input. According to an embodiment of the present disclosure, the electronic device determines whether at least one event for inputting voice from among menu selection, gesture detection, and button inputting, occurs in the application program 801, in addition to inputting the voice input icon 805 included in the keypad 803.

Figure 8B:
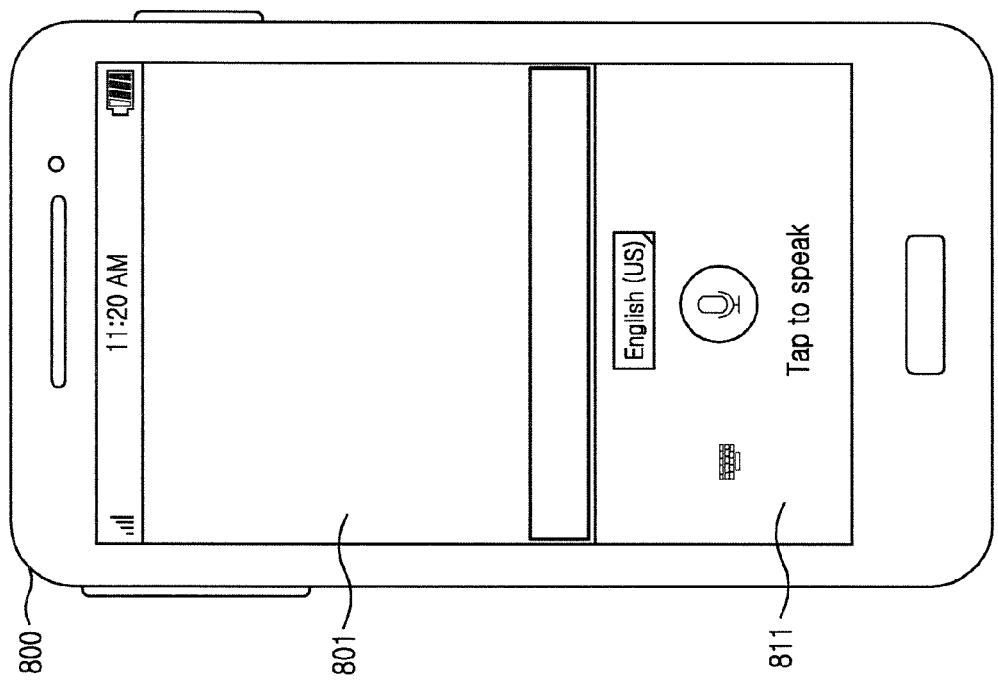
Figure 8B:
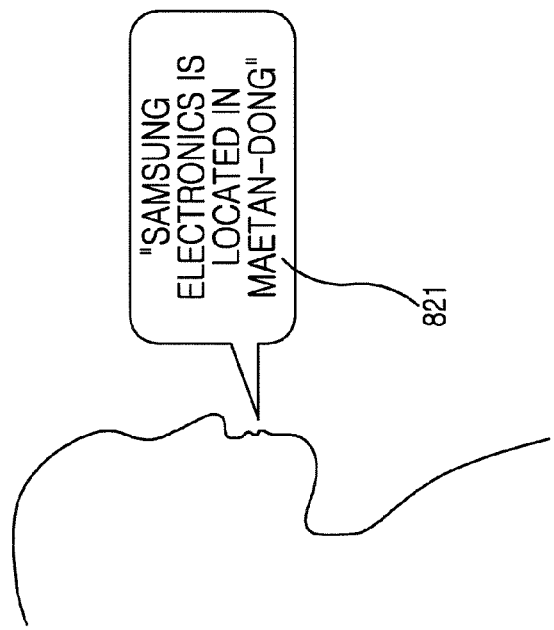
Figure 8C:
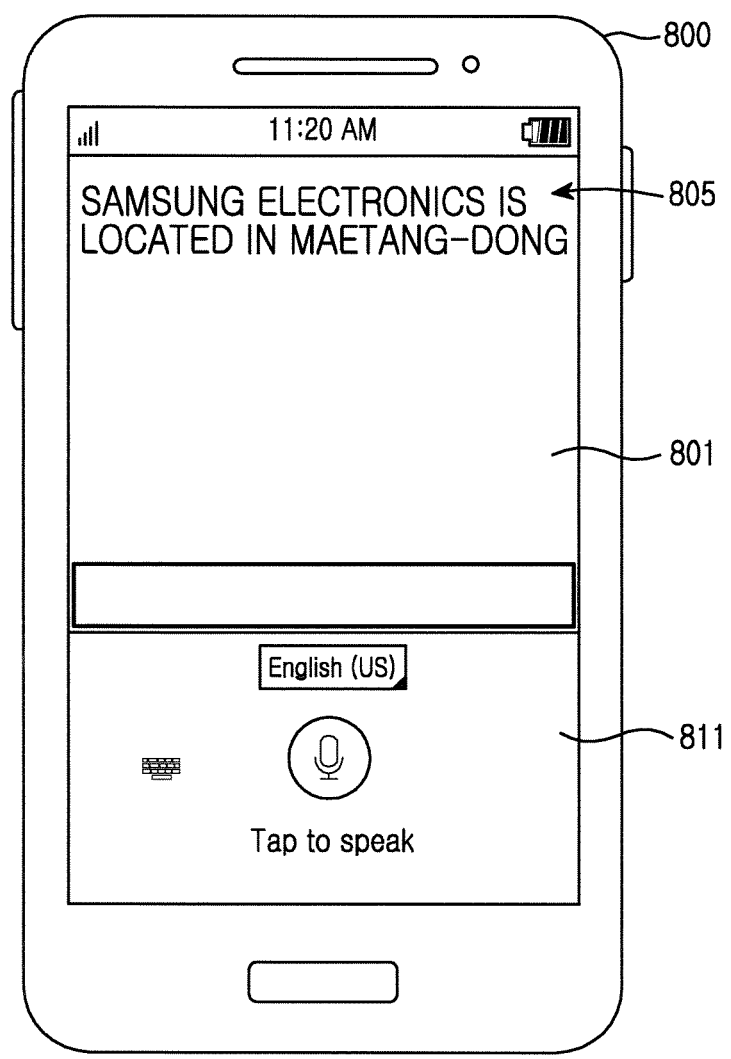

When a voice input event occurs, the electronic device can output a text based on an input voice, in operation 705. For example, as illustrated in FIG. 8B, when a voice input spoken by a user such as "Samsung Electronics is located in Maetan-dong" 821, the electronic device 800 can output, based the provided voice input, "Samsung Electronics is located in Maetang-dong" 805 in the application 801 as illustrated in FIG. 8C. According to an embodiment of the present disclosure, when a voice input spoken by a user such as "Samsung Electronics is located in Maetan-dong" 821, the electronic device can erroneously recognize "Maetan-dong" as "Maetang-dong, resulting to have "Samsung Electronics is located in Maetang-dong".

In operation 707, the electronic device can determine whether a text input that is to be used as a replacement is generated in output text. For example, the electronic device 800 can determine whether a text input is generated through the keypad 803 in the application program 801 for providing a text input.

Figure 8D:
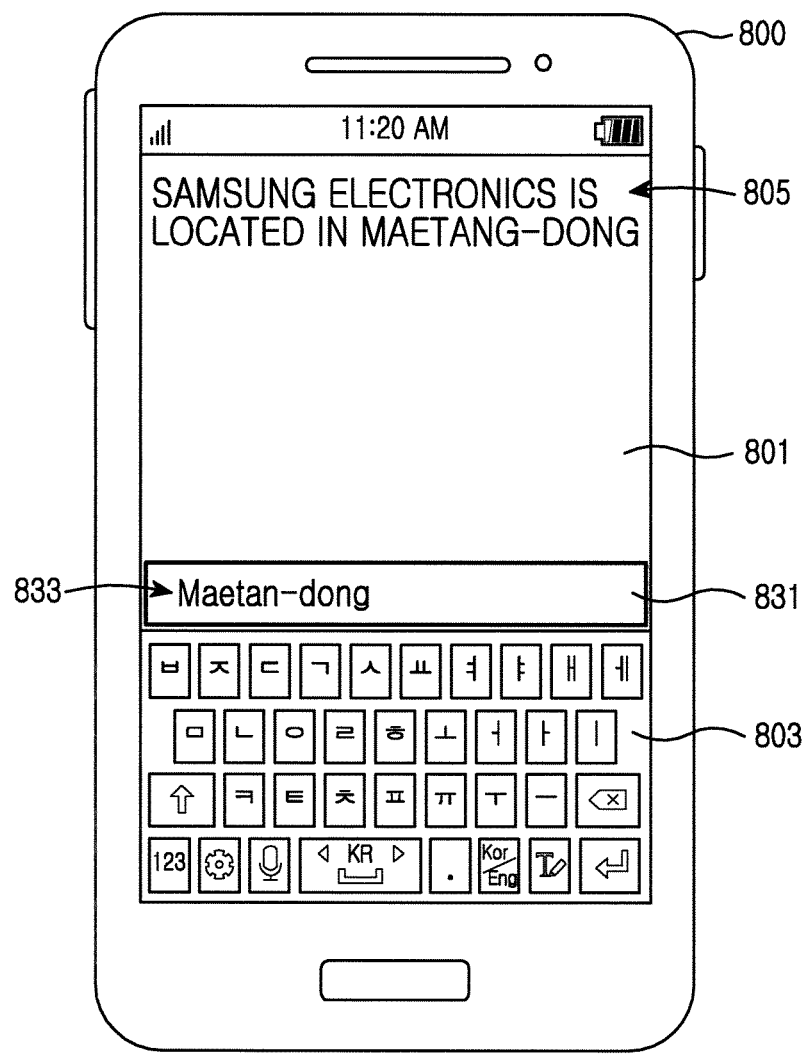

In operation 709, the electronic device determines whether a text similar to the text that is to be used as a replacement exists in the voice recognized text. For example, as illustrated in FIG. 8D, when "Maetan-dong" 833 is entered from the keypad 803, the electronic device 800 can determine whether a text similar to "Maetan-dong" 833 exists in the voice recognized text, "Samsung Electronics is located in Maetang-dong" 805.

Figure 8E:
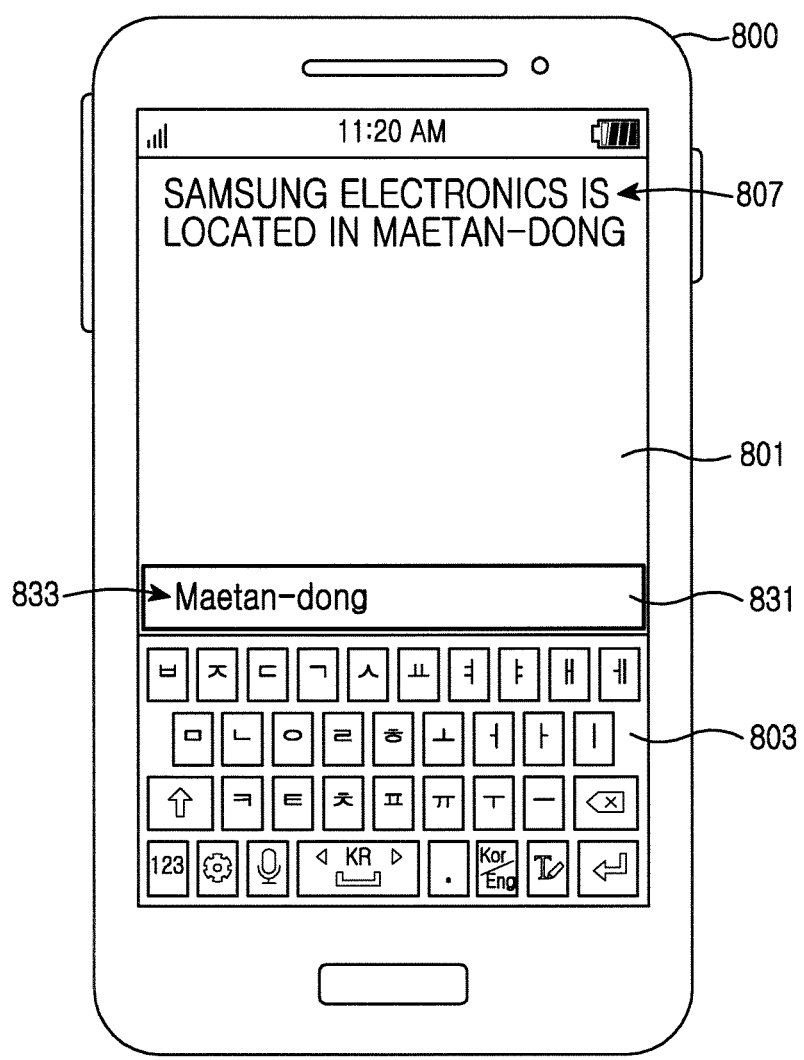

In operation 711, the electronic device can correct the recognized text. For example, as illustrated in FIG. 8E, when a text similar to "Maetan-dong" 833 entered from the keypad 803 exists in the voice recognized input, the electronic device correct "Maetang-dong" with "Maetan-dong" and the corrected recognized text is "Samsung Electronics is located in Maetan-dong" 807. In addition, the electronic device stores "Maetan-dong" entered from the keypad in a database, so as to provide the same to recognize "Maetan-dong" when voice is input, for hereafter cases.

Figure 9:
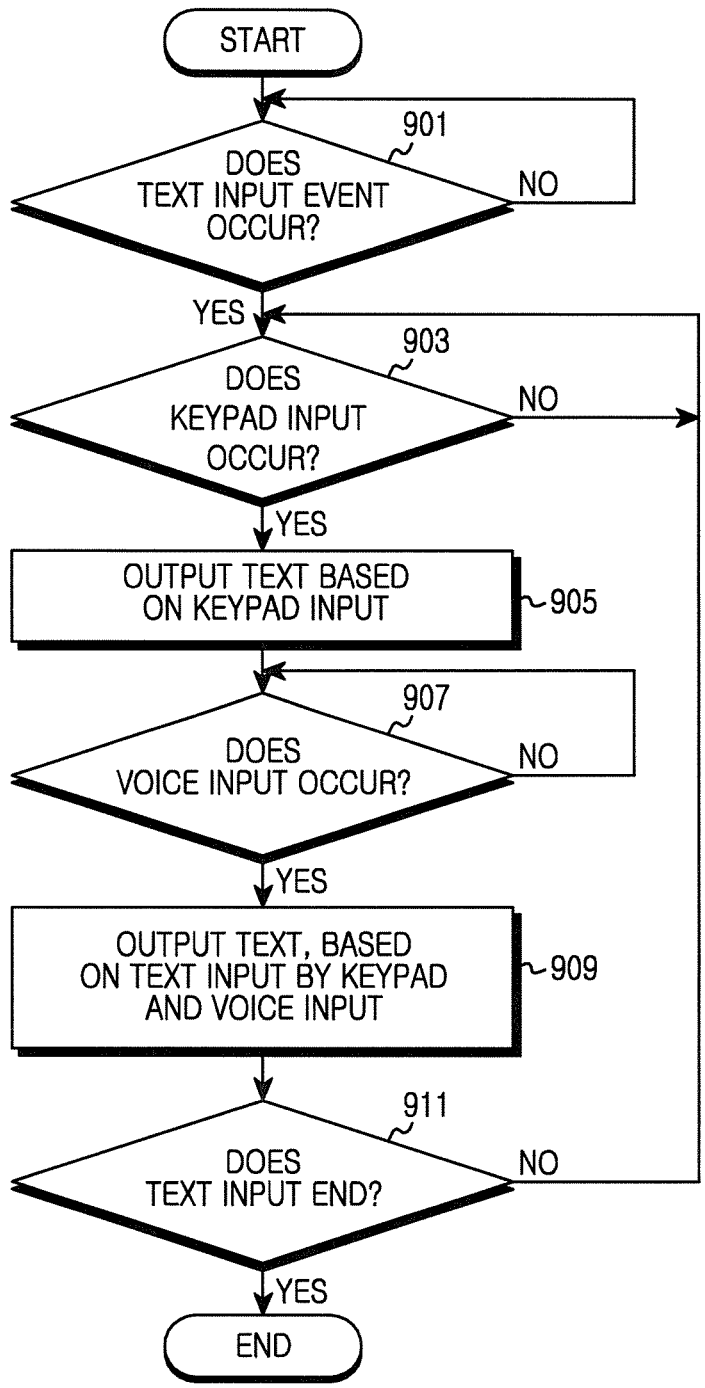
FIG. 9 illustrates a procedure of inputting text based on an input text and a voice input in an electronic device according to various embodiments of the present disclosure.

FIG. 9 illustrates a procedure for inputting a text based on an input text and a voice input in an electronic device according to various embodiments.

Figure 10A:
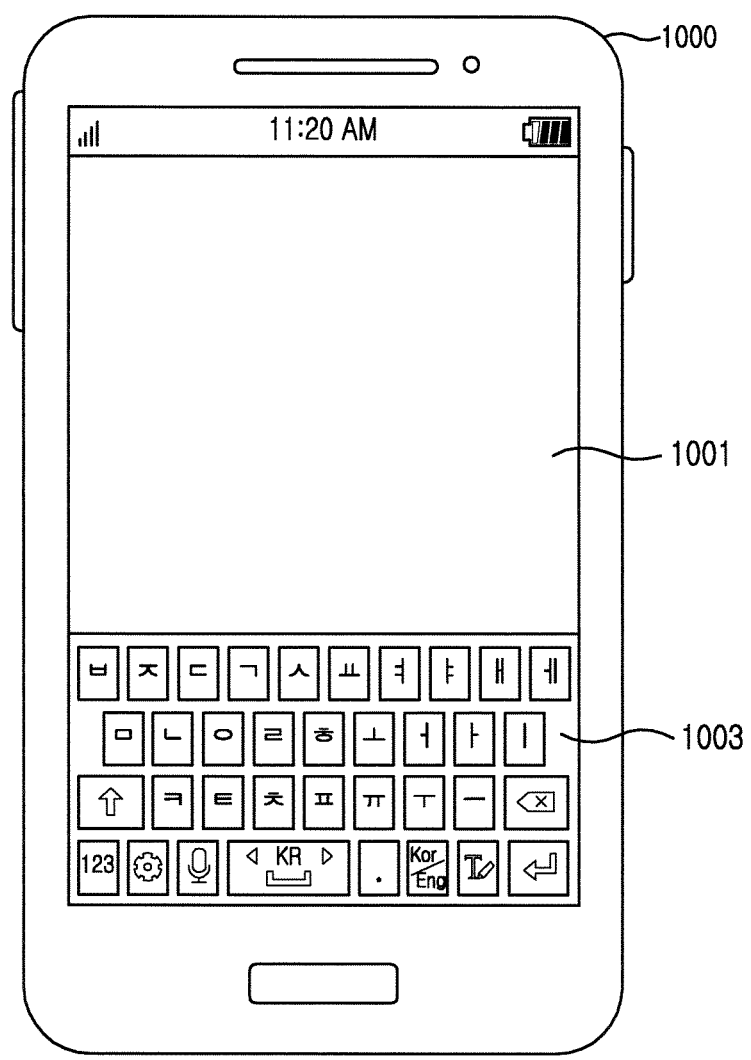
FIG. 10A to 10G illustrate screens for inputting text based on an input text and a voice input in an electronic device according to various embodiments of the present disclosure.

Referring to FIG. 9, an electronic device determines whether a text input event occurs, in operation 901. For example, as illustrated in FIG. 10A, an electronic device 1000 can determine whether a keypad call event for inputting a text occurs in the application program 1001 for providing a text input. According to an embodiment of the present disclosure, the electronic device can determine whether at least one event for inputting text from among menu selection, gesture detection, and button inputting, occurs.

In operation 903, the electronic device can determine whether a keypad input event occurs. For example, as illustrated in FIG. 10A, the electronic device 1000 can determine whether a keypad input event for inputting a text occurs in the application program 1001 for providing a text input.

Figure 10B:
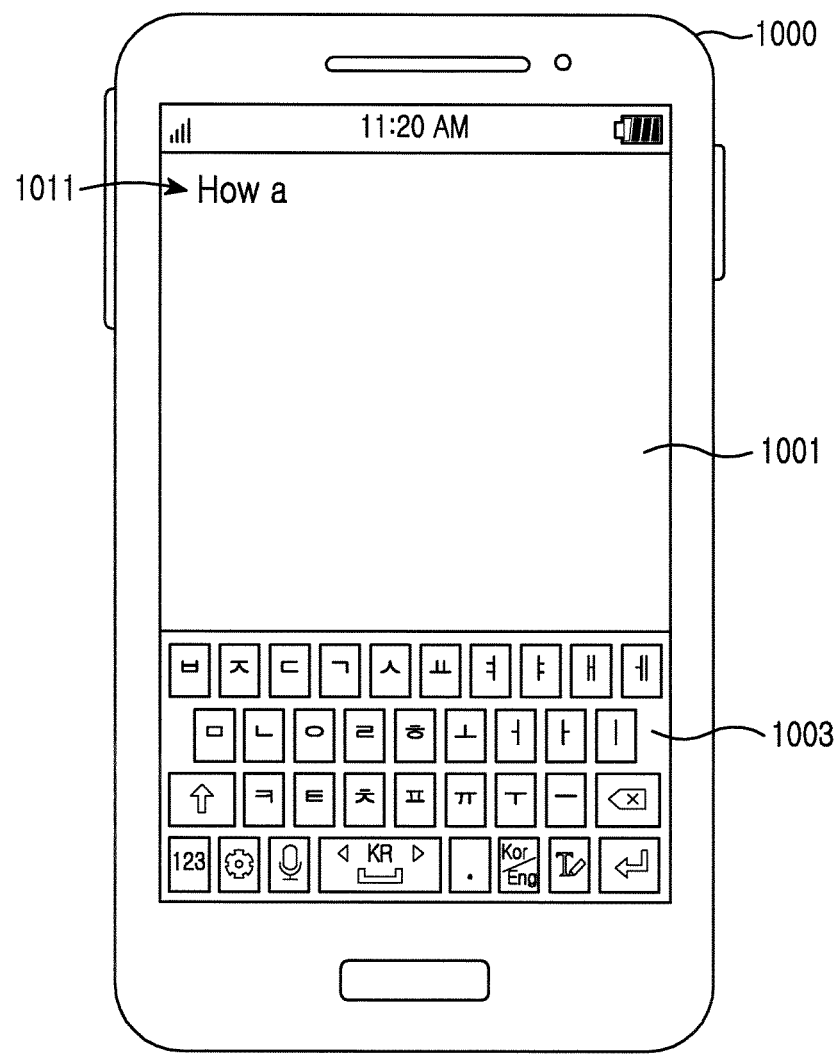

When the keypad input event occurs, the electronic device can output a text based on a keypad input, in operation 905. For example, as illustrated in FIG. 10B, the electronic device 1000 can output "How a" 1011 based on an input of a user through the keypad 603.

In operation 907, the electronic device can determine whether a voice input event occurs. According to an embodiment of the present disclosure the electronic device can simultaneously execute text inputting through a keypad and text inputting through a voice input.

Figure 10C:
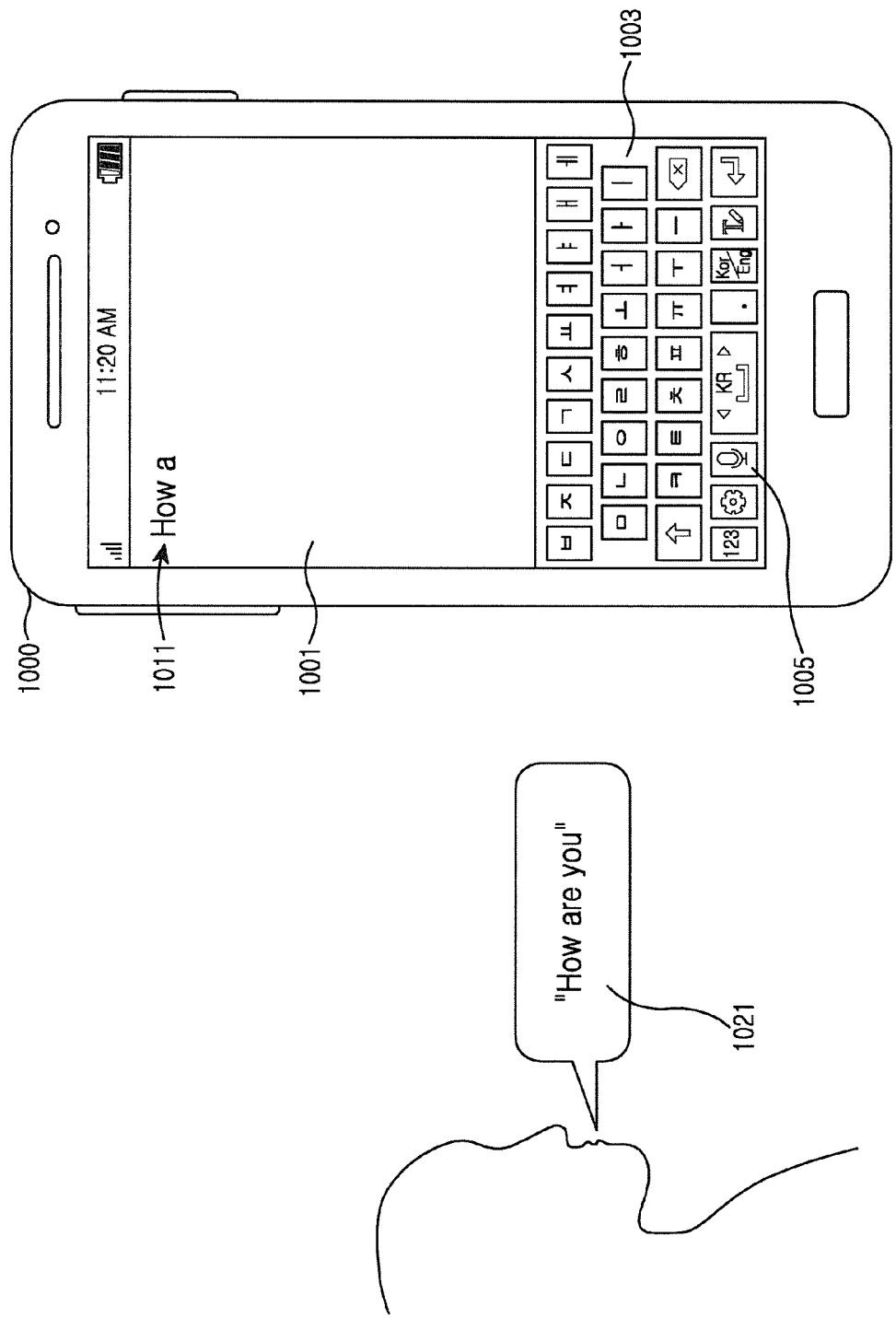
Figure 10D:
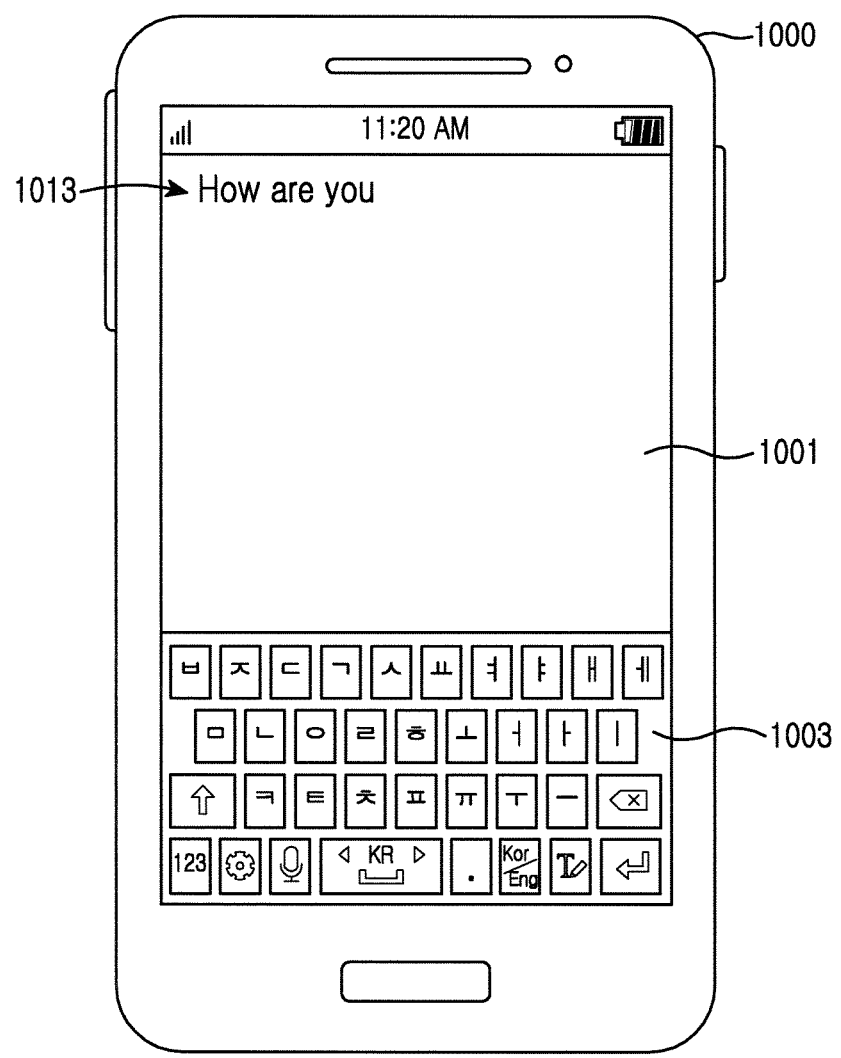

In operation 909, the electronic device can output a text based on a text input by the keypad and the voice input. For example, as illustrated in FIG. 10C, when "How are you" 1021 is recognized through the voice input after "How a" 1011 is entered from the keypad, the electronic device 1000 can output "How are you" 1013 as illustrated in FIG. 10D.

In operation 911, the electronic device can determine whether inputting the text ends.

Figure 10E:
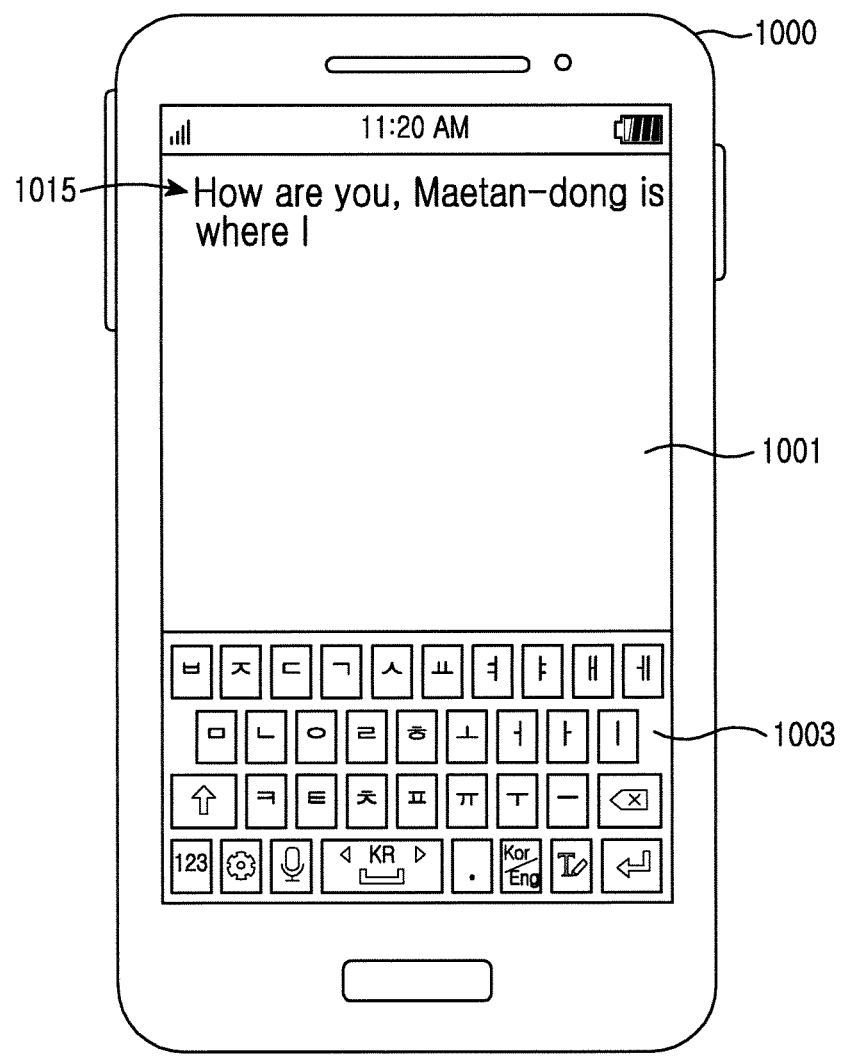
Figure 10F:
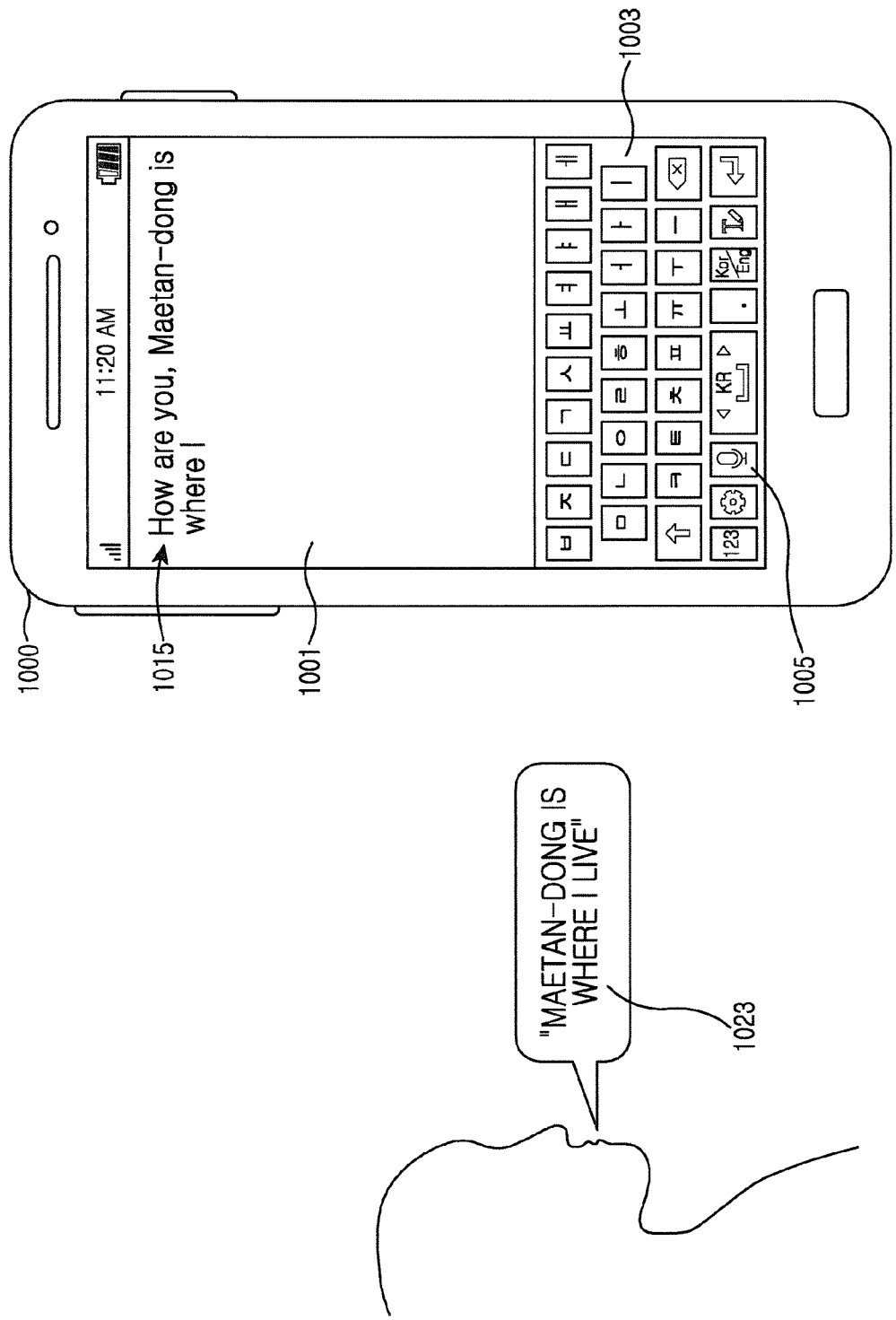
Figure 10G:
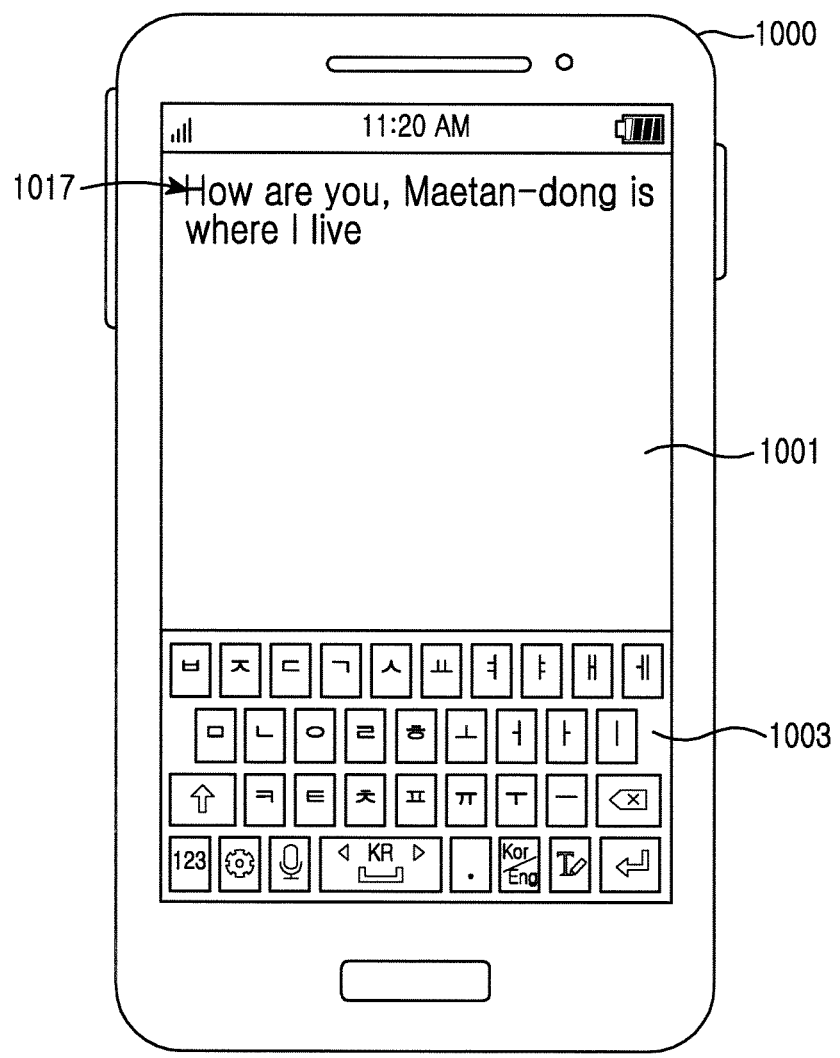

According to an embodiment of the present disclosure when inputting the text does not end and "Maetan-dong is where I" is additionally input after "How are you" that is previous input, as illustrated in FIG. 10E, the electronic device can determine whether a voice input is generated. When "Maetan-dong is where I live" 1023 is recognized through a voice input as illustrated in FIG. 10F, the electronic device 1000 can input "Maetan-dong is where I live" 1017 as illustrated in FIG. 10G.

According to various embodiments, operations of an electronic device for controlling a text input can include detecting an input of a first text, detecting a voice input, executing voice recognition with respect to the detected voice so as to detect a second text corresponding to the detected voice, and converting at least a part of the second text into the first text.

According to various embodiments, converting at least a part of the second text into the first text includes detecting text similar to the first text from the second text, and converting, into the first text, the text similar to the first text, in the second text.

According to various embodiments, the electronic device can further include a display unit that converts at least a part of the second text into the first text and displays the same.

As described above, the electronic device receives an input of text that is to be used as a replacement when voice is input, so as to increase the accuracy in inputting text associated with a voice input.

It will be appreciated that embodiments of the present disclosure according to the claims and description in the specification can be realized in the form of hardware, software or a combination of hardware and software.

Any such software can be stored in a computer readable storage medium. The computer readable storage medium stores one or more programs (software modules), the one or more programs comprising instructions, which when executed by one or more processors in an electronic device, cause the electronic device to perform a method of the present disclosure.

Any such software can be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are embodiments of machine-readable storage that are suitable for storing a program or programs comprising instructions that, when executed, implement embodiments of the present disclosure.

Accordingly, embodiments provide a program comprising code for implementing apparatus or a method as claimed in any one of the claims of this specification and a machine-readable storage storing such a program. Still further, such programs can be conveyed electronically via any medium such as a communication signal carried over a wired or wireless connection and embodiments suitably encompass the same.

The programming module according to the present disclosure can include one or more of the aforementioned components or can further include other additional components; or some of the aforementioned components can be omitted. Operations executed by a module, a programming module, or other component elements according to various embodiments of the present disclosure can be executed sequentially, in parallel, repeatedly, or in a heuristic manner. Further, some operations can be executed according to another order or can be omitted, or other operations can be added.

Meanwhile, the exemplary embodiments disclosed in the specification and drawings are merely presented to easily describe technical contents of the present disclosure and help the understanding of the present disclosure and are not intended to limit the scope of the present disclosure. Accordingly, the scope of the present disclosure should be construed that all modifications or modified forms derived based on the technical idea of the present disclosure are included in the scope of the present disclosure.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for an electronic device, the method comprising:
   receiving, by a processor of the electronic device, an input of a first text;
   receiving, by the processor, a voice input;
   transforming the voice input into a second text by performing voice recognition;
   determining at least a part of the second text corresponding to the first text;
   correcting, by the processor, the second text by replacing at least a part of the second text with the first text; and
   outputting, by the processor, the corrected second text.

2. The method of claim 1, the method further comprising: storing the first text in a database.

3. The method of claim 1, wherein the second text contains a misspelled portion.

4. The method of claim 1, wherein the input of the first text is received from a keypad.

5. The method of claim 1, wherein the determining the at least a part of the second text comprises:
   determining the at least a part of the second text based on a similarity to the first text.

6. The method of claim 1, wherein the outputting of the corrected second text comprises:
   displaying the corrected second text on a screen.

7. An electronic device for recognizing a voice, the device comprising:
   a sensor configured to recognize a voice input;
   a processor configured to:
      receive an input of a first text through a keypad of the electronic device;
      receive a voice input through the sensor;
      transform the voice input into a second text by performing voice recognition;
      determine at least a part of the second text corresponding to the first text;
      correct the second text by replacing the at least a part of the second text with the first text; and
      output the corrected second text.

8. The electronic device of claim 7, further comprising a database configured to store a first text.

9. The electronic device of claim 7, wherein the second text contains a misspelled portion.

10. The electronic device of claim 7, wherein the keypad includes a virtual keypad.

11. The electronic device of claim 7, wherein the processor is configured to determine the at least a part of the second text based on a similarity to the first text.

12. The electronic device of claim 7, further comprising a display, wherein the processor is further configured to control the display to display the corrected second text.

13. A non-transitory computer-readable recording medium, storing instructions that when executed, cause a processor configured to:
   receive an input of a first text;
   receive a voice input;
   transform the voice input into a second text by performing voice recognition;
   determine at least a part of the second text corresponding to the first text;
   correct the second text by replacing at least a part of the second text with the first text; and
   output the corrected second text.

14. The non-transitory computer-readable recording medium of claim 13, wherein the processor is further configured to store the first text in a database.

15. The non-transitory computer-readable recording medium of claim 13, wherein the second text contains a misspelled portion.

16. The non-transitory computer-readable recording medium of claim 13, wherein the input of the first text is received from a keypad.

17. The non-transitory computer-readable recording medium of claim 16, wherein the keyboard comprises a virtual keyboard.

18. The non-transitory computer-readable recording medium of claim 13, wherein the determine the at least a part of the second text comprises determining the at least a part of the second text based on a similarity to the first text word.

* * * * *